United States Patent
Dailey

(10) Patent No.: US 6,330,483 B1
(45) Date of Patent: Dec. 11, 2001

(54) OPTIMAL CONTROL SYSTEM

(75) Inventor: Russell L. Dailey, Newcastle, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/306,900

(22) Filed: May 7, 1999

(51) Int. Cl.[7] .................................................. G05B 13/02
(52) U.S. Cl. ............................... 700/28; 700/31; 700/44; 700/45; 700/89; 318/561; 318/606
(58) Field of Search .......................... 700/89, 28, 29, 700/30, 31, 37, 38–39, 44, 45, 47, 41–43; 318/561, 606–610

(56) References Cited

U.S. PATENT DOCUMENTS

| | | |
|---|---|---|
| 4,335,432 | 6/1982 | Pue . |
| 4,872,104 | 10/1989 | Holsinger . |
| 5,141,177 | 8/1992 | Wright et al. . |
| 5,239,456 | 8/1993 | Badavas et al. . |
| 5,311,421 * | 5/1994 | Nomura et al. .......................... 700/37 |
| 5,331,565 | 7/1994 | Hattori et al. . |
| 5,359,520 | 10/1994 | Aubrun et al. . |
| 5,515,265 | 5/1996 | Van As et al. . |
| 5,561,598 | 10/1996 | Nowak et al. . |
| 5,614,801 | 3/1997 | Miramonti . |
| 6,137,886 * | 10/2000 | Herman et al. ...................... 381/71.2 |

OTHER PUBLICATIONS

Dahleh, M.A., "$l^1$–Optimal Feedback Controllers for MIMO Discrete–Time Systems", *IEEE Transactions On Automatic Control*, vol. AC–32, No. 4, pp. 314–322, (Apr. 1987).

Young, P.M. and Dahleh, M.A., "Controller Design for Mixed L1/LMI Performance Objectives", Proceedings of the American Control Conference, Seattle, Washington, WP16–3:30, pp. 1433–1437, (Jun. 1995).

Vidyasagar, M., "Optimal Rejection of Persistent Bounded Disturbances", *IEEE Transactions on Automatic Control*, AC–31 No. 6, pp. 527–534, (Jun. 1986).

Womack, B.F., "A Review of the Status of Optimization Theory Today and its Applicability to Present Day Industrial Systems", Fifth Annual Advanced Control Conference Purdue, pp. 1–15, Apr. 9–11, (1979).

(List continued on next page.)

*Primary Examiner*—William Grant
*Assistant Examiner*—Ramesh Patel
(74) *Attorney, Agent, or Firm*—Christensen O'Connor Johnson Kindness PLLC

(57) ABSTRACT

An optimal control system is described having multiple aspects. In one aspect, an arrangement is provided for eliminating integrator windup. This aspect includes forming a control difference signal that is a combination of differenced inputs and then subsequently integrating and limiting the control difference signal to form a control signal that is provided to the plant. In another aspect, an arrangement is provided for eliminating cross-channel coupling. In this aspect, an error signal is formed as the difference between a commanded signal and a regulator sensor signal. In addition, an injection error signal is combined with the error signal. The injection error is of an amount sufficient to ensure that only an attainable command signal is provided to the plant, without significant cross-channel coupling due to saturation of a control effector. In another aspect, an arrangement is provided for improving output mixing of the control signal between available plant effectors. The aspects of eliminating cross-channel coupling and output mixing rely on an optimization algorithm newly described herein and termed the Dailey L1 Optimization Algorithm.

22 Claims, 20 Drawing Sheets

OTHER PUBLICATIONS

Dantzig, G.B., "Notes on Linear Programming: Part III, Computational Algorithm of the Revised Simplex Method", *U.S. Air Force Project Rand Research Memorandum*, pp. 1–9, (Oct. 26, 1953).

Clarke, F.H., "Optimization and Nonsmooth Analysis", *Canadian Mathematical Society Series of Monographs and Advanced Texts*, pp. 1–23, (1983).

Dantzig, G.B., "Linear Programming and Extensions", The Rand Corporation and University of California, Berkeley (1963).

Chenery, S., and S. Walsh, "$l_1$–Optimisation and Process Controllability Analysis," *UKACC International Conference on Control*, Sep. 2–5, 1996, Conference Publication No. 427, pp. 2–5.

Murray, D. M.; "The relationship between terminal state constraints and penalties for the discrete–time LQP problem associated with the adjustment of accelerometer data," *Journal of Computational and Applied Mathematics 18*:83–91, 1987.

\* cited by examiner

OPTIMAL CONTROL SYSTEM

FIELD OF THE INVENTION

The present invention relates to control systems, and more particularly to real-time control systems for which an optimized output is desired.

BACKGROUND OF THE INVENTION

Control systems often use integrating feedback in order to eliminate steady-state tracking errors. Typically, these control systems include an implementation in which internal state variables integrate or accumulate over time the values of feedback error signals. Because such internal state variables cannot maintain a steady state value unless their input error signals are zero, integrating feedback causes the error signals to go to zero in the steady state. There are a number of problems associated with these conventional control systems that have long plagued designers in attempting to create fast, efficient, accurate, and optimized control command outputs for a particular application. These problems include integrator windup, cross-channel coupling, channel prioritization, and output mixing.

Integrator windup refers to a control situation in which a large disturbance (or even a large command) causes a control output signal to exceed some physical limit of the plant's controls. This causes control "saturation". For example in an airplane flight control system, rudder deflection might be limited physically to ±30 degrees. If a large disturbance occurs and the rudder command becomes saturated due to this limit, the plant is running "open loop" in the sense that incremental changes to the rudder command will have no effect on the rudder's actual positioning—the rudder is already at a limit. Thus during saturation, the rudder error signal will not immediately be driven toward zero by incremental feedback action. Instead, the integrator signal will "wind up" and continue to increase. After the saturation event ends, normal feedback action will resume and force the error signal back toward zero. However, by that time, the integrator signal may have increased to a large value, forcing the control signal far away from its normal steady-state value. The usual result is a large temporary overshoot in the command signal, as feedback action causes the error signal to reverse sign in order to "unwind" the integrator state back to its final steady-state value.

Prior attempts to solve the integrator windup problem have generally involved writing special-purpose switching logic code to freeze the integrator states during control saturation. Freeze logic typically holds the integrator state constant during saturation events, until the control signal drops below the saturation threshold. This method often fails in multi-channel controllers because there is no one-to-one relationship between each control and each integrator state, a fact that leads to cross-channel coupling, described below. Because the control signal depends directly upon the frozen integrator state, freeze logic is also prone to "chattering" when the logic alternately freezes and unfreezes the integrator on successive time steps. Freeze logic that avoids chattering can be difficult to write and debug, and often requires tremendous amounts of coding.

Other prior attempts to solve the problem of integrator windup use command limiting in which the magnitude and rate of change of external commands are restricted before they enter the feedback loop. This technique unnecessarily restricts the performance of the control system by preventing the controls from reaching their true limits. It is also vulnerable to large system disturbances, that cannot be artificially limited.

In addition to integrator windup, for multi-channel systems (i.e., those having matrix gains and vector variables), there is an undesirable problem of cross-channel coupling that can occur even when integrator windup has been eliminated. In a multi-channel integrating control system, more than one error signal is being driven to zero. For example, a multi-channel aircraft control system might regulate roll rate and sideslip angle simultaneously by commanding both aileron and rudder deflections. During control saturation, transient tracking errors can appear in both command channels. This occurs even when integrator windup is eliminated. In this example, rudder saturation might introduce errors in both roll rate and sideslip angle command tracking, because the nonsaturated aileron signal depends upon both error signals (i.e., both a roll rate error signal and a sideslip angle error signal.) This phenomenon does not occur in single-channel control systems where each control is driven by a single error signal. In some cases, it is desired to assign fixed priorities to the regulation channels, so that transient tracking errors from saturation are confined to the least-important channels when possible. In aircraft, for example, tight regulation of sideslip angle might be considered more important than roll rate error.

The problem of cross-channel coupling can be exacerbated if a designer attempts to use traditional freeze logic on an integrator to control windup when its corresponding control actuator is saturated. This is particularly true if there is no one-to-one correspondence between the command inputs and the output control variables, thus posing a system with inherent coupling of its variables.

In addition to integrator windup and its associated problems, a further problem exists in conventional control systems regarding allocation of control responses between different control actuators (or more generally "control effectors") and regarding the application of limits to the commanded outputs. Conventional gain matrix output mixers typically produce commands based on a gain matrix that weighs various input commands based a predefined value system. Since the final control effector commands are subject to saturation by the physical limits of the actual controls, conventional mixers often include a hard limiter function, where the final output of the mixer is a limited control effector command. Each element of the control output vector from the mixer has its own independent upper and lower bounds, which are applied by the hard limiter function.

These prior implementations of output mixers have usually applied linear gain matrices to distribute the total power commands to the complete set of control effectors. This approach is valid for typical small-signal operation, but it introduces control power errors and potential degraded stability when one or more of the control effectors is saturated. Attempts to address that problem have usually involved limiting the total power commands in order to keep the control effectors out of saturation. This has the undesirable effect of preventing the control system from producing the full range of possible control power. Thus, the control effectors are not used to their fullest combined capacity.

In addition, prior methods for general-purpose nonlinear control using internal dynamic models (e.g., dynamic inversion and feedback linearization) solve certain model equations at each time step. These known methods fail when the controls saturate, because the equations have no exact solutions in those cases. These older methods also have no ability to incorporate inequality constraints on the controls and states.

Thus, a need exists for a control system capable of eliminating integrator windup, improving output mixing, and reducing the problems related to both integrator windup and output mixing. The ideal system would provide fast, reliable, control commands that take full advantage of all control effectors within the boundaries of each effector's capacity. The present invention is directed to fulfilling these and other needs as described below.

SUMMARY OF THE INVENTION

In accordance with aspects of the present invention, an optimal control system is provided. The system relies on an optimization algorithm newly described herein and termed the Dailey L1 Optimization Algorithm. In one embodiment, the system is arranged to eliminate integrator windup. This embodiment includes forming a control difference signal that is a combination of differenced inputs and then subsequently integrating and limiting the control difference signal to form a control signal that is provided to the plant.

In accordance with other aspects of this invention, another embodiment is described in which cross-channel coupling is eliminated. An error signal is formed as the difference between a commanded signal and a regulator sensor signal. An injection error signal is combined with the error signal. The injection error is of an amount sufficient to ensure that only an attainable command signal is provided to the plant, without significant cross-channel coupling due to saturation of a control effector. Yet another embodiment is provided in which output mixing of the control signal between available plant effectors is improved by determining the optimal mix of control effectors using the LI Algorithm.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is an optimal control system (also referred to herein as an optimal controller) that may be used in various technologies to eliminate disadvantages of prior art control systems, such as those discussed above. The present invention is described below using generic control terms. These terms may be realized using conventional components available in the art. Even though the present invention is described generically, it is to be understood that its teachings are applicable to a wide range of technologies.

There are a number of inventive aspects provided in the present invention optimal control system. When approaching a particular control problem, a designer can use these aspects as necessary to best address the characteristics of his or her application. For the sake of clarity in presentation, the description below is divided into a number of sections. PART 1 describes a method and apparatus for eliminating integrator windup and additionally for providing automatic command limiting and channel prioritization in multi-channel control systems. PART 2 describes a method and apparatus for efficiently distributing control commands between multiple control effectors while simultaneously enforcing constraints on them. PART 3 describes an overall general method and apparatus that combines the features of PARTS 1 and 2. Each part includes a discussion of the relative prior art.

The present invention is termed an "optimal" system because it makes use of an optimization method embedded in a real-time control system. Although a number of optimization methods are known and some of which may be used with the various aspects of the present invention control system, a preferred method of optimization is also provided and is described in PART 4. This preferred method is termed the "Dailey L1 Optimization Algorithm" and is itself unique. The Dailey L1 Optimization Algorithm presented herein efficiently solves a class of convex optimization problems in a manner that is ideally suited to the aspects of the present invention optimal control system.

PART 1

This section describes a method and apparatus for eliminating integrator windup in both single and multi-channel control systems and additionally for providing automatic command limiting and channel prioritization in multi-channel control systems. Discussion of a single-input-single-output (SISO) system is provided first with reference to FIGS. 1 through 5, followed by a discussion of a multi-input-multi-output (MIMO) system with reference to FIGS. 6 through 13.

Figure 1:
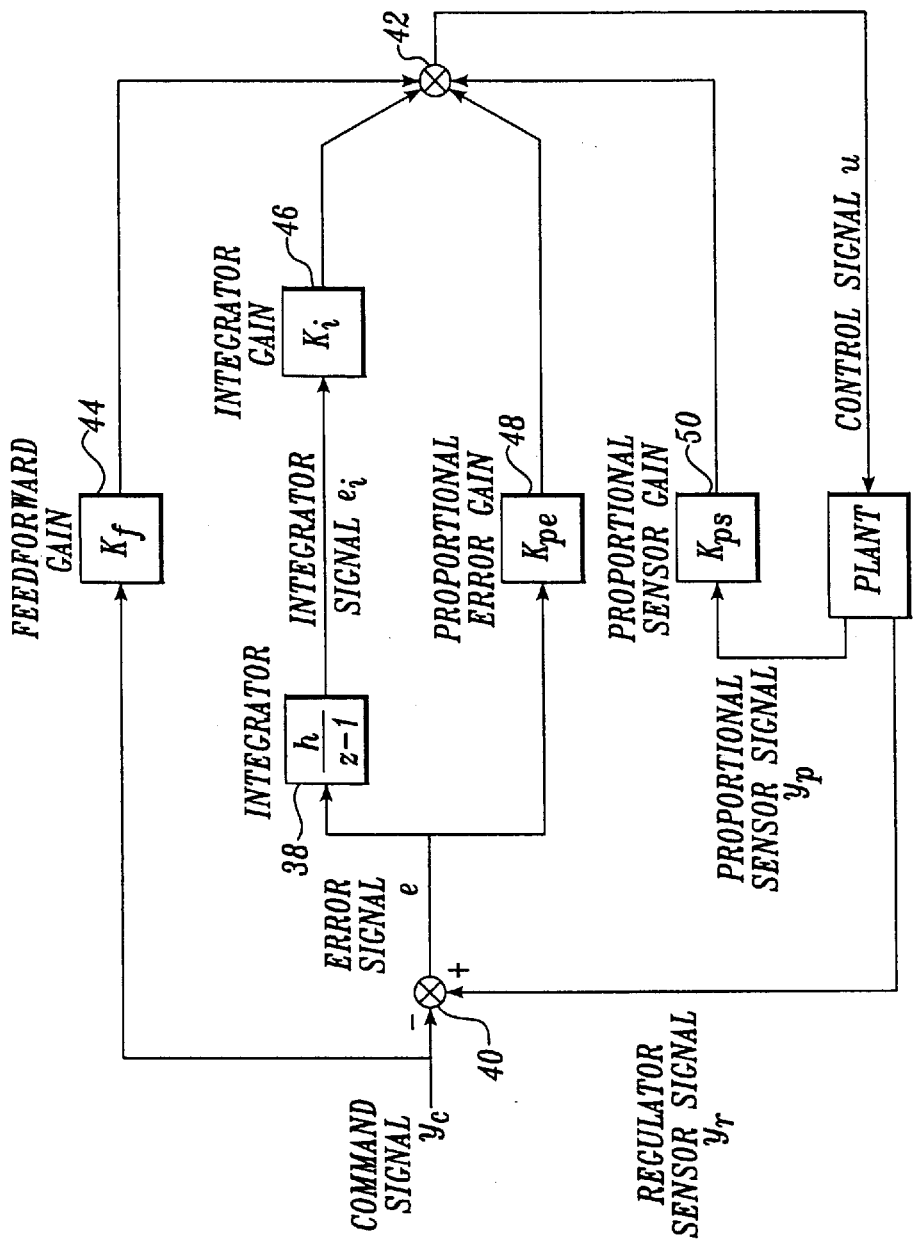
FIG. 1 is a control flow diagram of a conventional implementation of a single-channel integrating control system.

FIG. 1 illustrates a conventional integrating control system representative of the prior art. This example is single-channel, having only one regulated variable, regulator sensor signal $y_r$, and one plant control signal u. This example is shown as a discrete-time system. The transfer function of an integrator 38 is $h/(z-1)$, using z-transform notation, where h is the discrete time step size in seconds. The integrator output signal $e_i(n+1)$ at each new time step n+1 depends on its value $e_i(n)$ and its input signal e(n) at the previous time step n, according to $e_i(n+1)=e_i(n)+e(n)$ h. Error signal e is based on the difference between a command signal $y_c$ and the plant's regulator output sensor signal $y_r$, using the formula $e=y_r-y_c$. The difference is calculated in FIG. 1 at a first combiner 40.

The output of the control system is the control signal u, here $u=K_i e_i + K_{pe} e + K_{ps} y_p + K_f y_c$. This combination is obtained by applying a proportional error gain $K_{pe}$ to the error signal e, a proportional sensor gain $K_{ps}$ to a proportional sensor signal $y_p$, an integrator gain $K_i$ to the integrator output signal $e_i$, and a feedforward gain $K_f$ to the command signal $y_c$. The calculation of u is accomplished in FIG. 1 at a second combiner 42. The gain $K_f$ is applied to the command signal $y_c$ at block 44, gain $K_i$ being applied to the integrator signal $e_i$ at block 46, gain $K_{pe}$ being applied to the error signal e at block 48, and gain $K_{ps}$ being applied to the proportional sensor signal $y_p$ at block 50. The signal $y_p$ can be a vector, in which case $K_{ps}$ is a matrix with one output row and multiple input columns. The other signals and gains in FIG. 1 are scalars.

The plant outputs both the regulator sensor $y_r$ and the proportional sensor vector $y_p$. This is to allow for arrangements in which it is not necessary to compare the feedback signals against the commanded values $y_c$, but instead the feedback signals are fed back directly to the control signal. For example, an aircraft control system might feed back yaw rate directly, without subtracting it from command reference values as it would with roll rate or sideslip angle. The gain matrix $K_{ps}$ applies proportional gains to such signals.

Control saturation will occur when a large command $y_c$ or a large disturbance causes the control output signal u to exceed the physical limits of the plant's controls. During saturation, incremental changes to u will have no effect on the plant output y. The error signal e will not be driven toward zero by incremental feedback action, so the integrator signal $e_i$ will "wind up". After the saturation event ends, normal feedback action will resume and force the error signal e back toward zero; however, by this time $e_i$ may have increased to a large value, forcing the control signal u far away from its normal steady-state value. The usual result is a large temporary overshoot in the regulator sensor signal $y_r$, as feedback action causes e to reverse sign in order to "unwind" the integrator state $e_i$ back to its final steady-state value.

The following example illustrates the effect of the arrangement of FIG. 1 as applied to a conventional rotary motor servo in which the control system objective is to cause the motor shaft angle θ to track a commanded value $θ_c$, using feedback on a shaft angle error $e=θ-θ_c$ and on a rotation rate ω. The single control input to the plant is a commanded motor torque T, which has upper and lower limits. The shaft's moment of inertia is I and its damping coefficient is b. The equations of motion may be expressed as $T=I\dot{ω}+bω$ and $\dot{θ}=ω$.

Using the values I=1.0 kg-m² and b=0.5 N-m-s, T has units of N-m, ω has units of radians/s, and θ has units of radians. A nominal control system may be designed in which an integrator is placed on the tracking error e, to produce a $3^{rd}$-order dynamic system containing three states: the integrator state $e_i$, the shaft angle θ, and the rotation rate $\dot{θ}$. There are then three closed-loop poles. The feedforward gain $K_f$ produces a transmission zero in the command response. The remaining gains may be selected so that the transmission zero cancels one of the three poles, so that the remaining two poles are those of a $2^{nd}$-order lowpass Bessel filter. This type of filter has a zero-overshoot step response. In this way, all of the command overshoot observed in the response can be attributed to control saturation, integrator windup, or system nonlinearity.

Relating the rotary motor servo to the arrangement of FIG. 1, the reference sensor signal is $y_r=θ$. The proportional sensor signal is $y_p=ω$. The error signal is $e=θ-θ_c$. The control output signal is the commanded motor torque, given by $T=u=K_i e_i + K_{pe} e + K_{ps} θ + K_f θ_c$. If the discrete-time integrator is modeled as a continuous-time integrator 1/s, the following integral-differential equation describes the closed-loop system in terms of θ and $θ_c$.

$$T = K_i \int (θ-θ_c)dt + K_{pe}(θ-θ_c) + K_{ps}\dot{θ} + K_f θ_c = I\ddot{θ} + b\dot{θ}$$

Applying the Laplace transform yields this transfer function from $θ_c$ to θ:

$$\frac{θ}{θ_c} = \frac{s(K_f - K_{pe}) - K_i}{s^3 I + s^2(b - K_{ps}) - sK_{pe} - K_i}$$

-continued $$= \frac{s+2}{(s+2)(s^2+1.732s+1)}$$

where $K_i$=−2.0, $K_{pe}$=−4.464, $K_{ps}$=−3.232, and $K_f$=−3.464 are used to produce the desired target poles and zeros.

Figure 2:
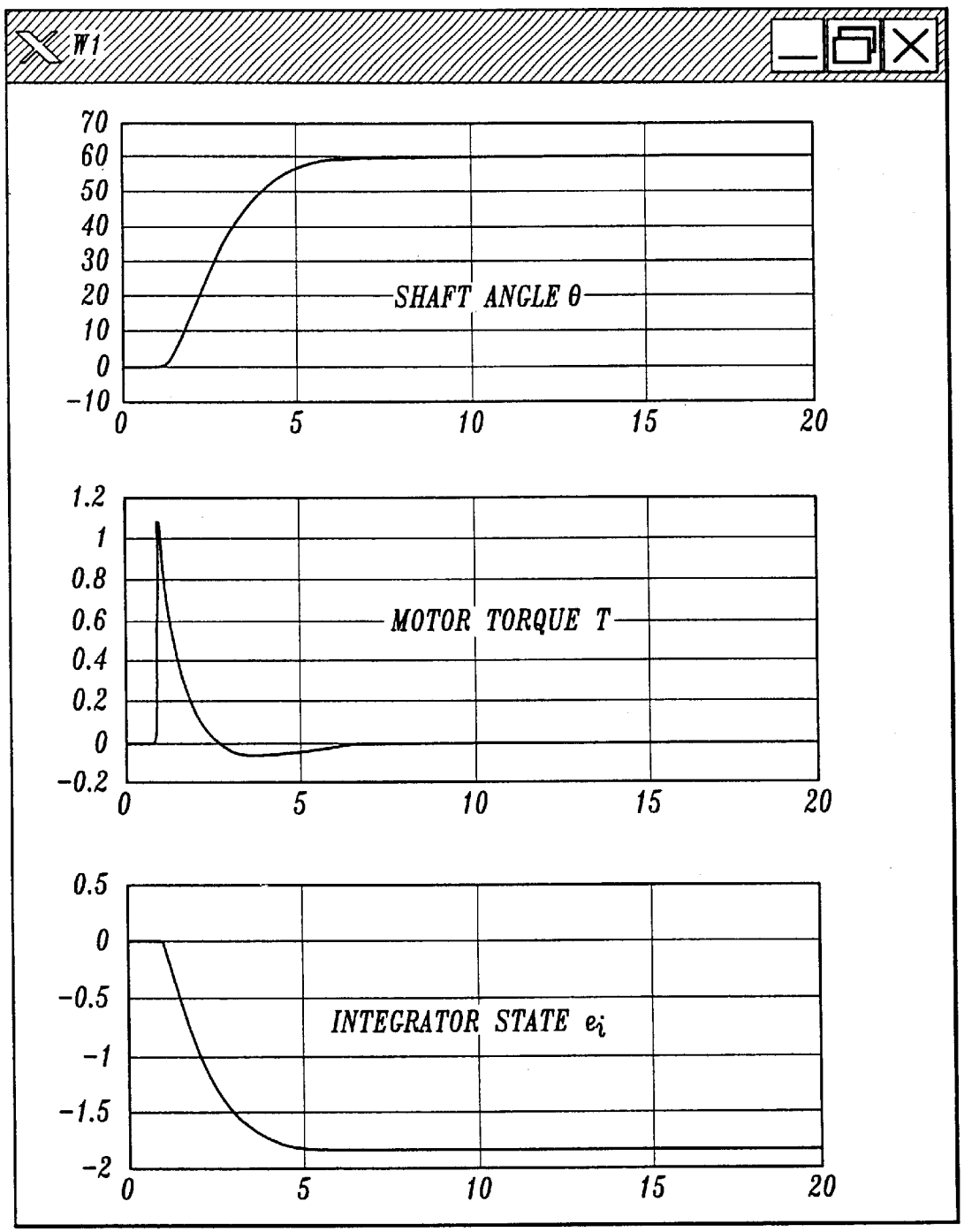
FIG. 2 is a series of time history plots illustrating the effects of a step input to a rotary motor servo example using a conventional single-channel integrating control system with no control saturation.

FIG. 2 shows the step response of this system to a 60-degree command $\theta_c$ when the limits on the control output signal u are set high so that no saturation occurs. The shaft angle acquires the 60 degree command $y_c$ with zero overshoot, as desired. The integrator state $e_i$ acquires a steady-state value, which is necessary in order to oppose the feedforward gain term $K_f\theta_c$.

Figure 3:
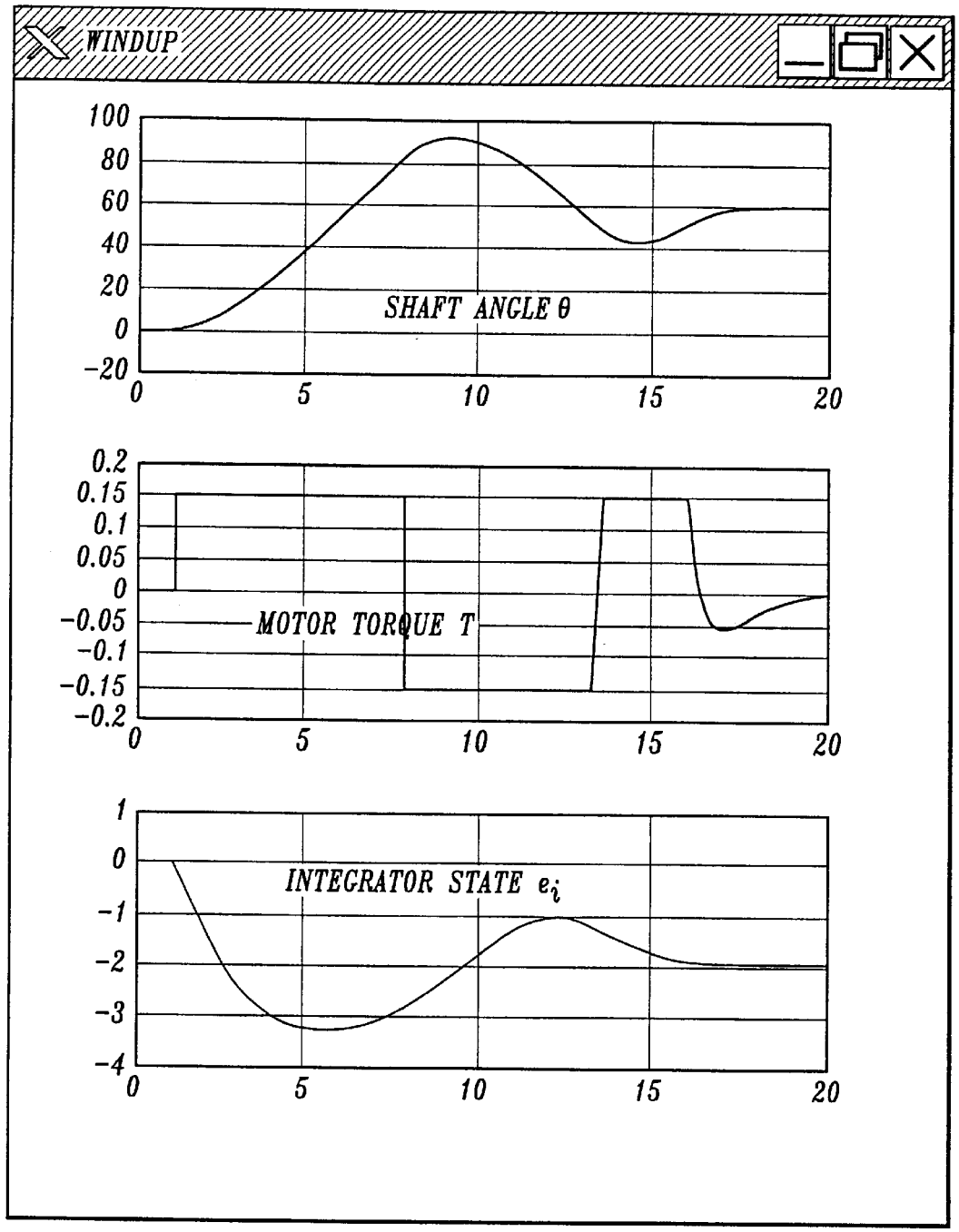
FIG. 3 illustrates the results of the rotary actuator of FIG. 2 during control saturation, particularly illustrating integrator windup in a conventional single-channel controller.

FIG. 3 shows the same quantities when control saturation occurs, to demonstrate integrator windup for this example. The limits on the control output signal u have now been set to ±0.15 N-m to produce deep saturation for the 60 degree step command. The large step command $\theta_c$ immediately forces the control output signal u into hard saturation. The integrator state $e_i$ then winds up to a large value, well beyond its steady-state value. The regulator sensor signal $y_r$ (equal to $\theta$) dramatically overshoots its final value while $e_i$ unwinds. For this particular choice of command, control limits, and gains, the control output signal u bounces between its limits three times before finally attaining equilibrium. It takes 16 seconds to reach equilibrium, versus 5 seconds in the unsaturated case.

Figure 4:
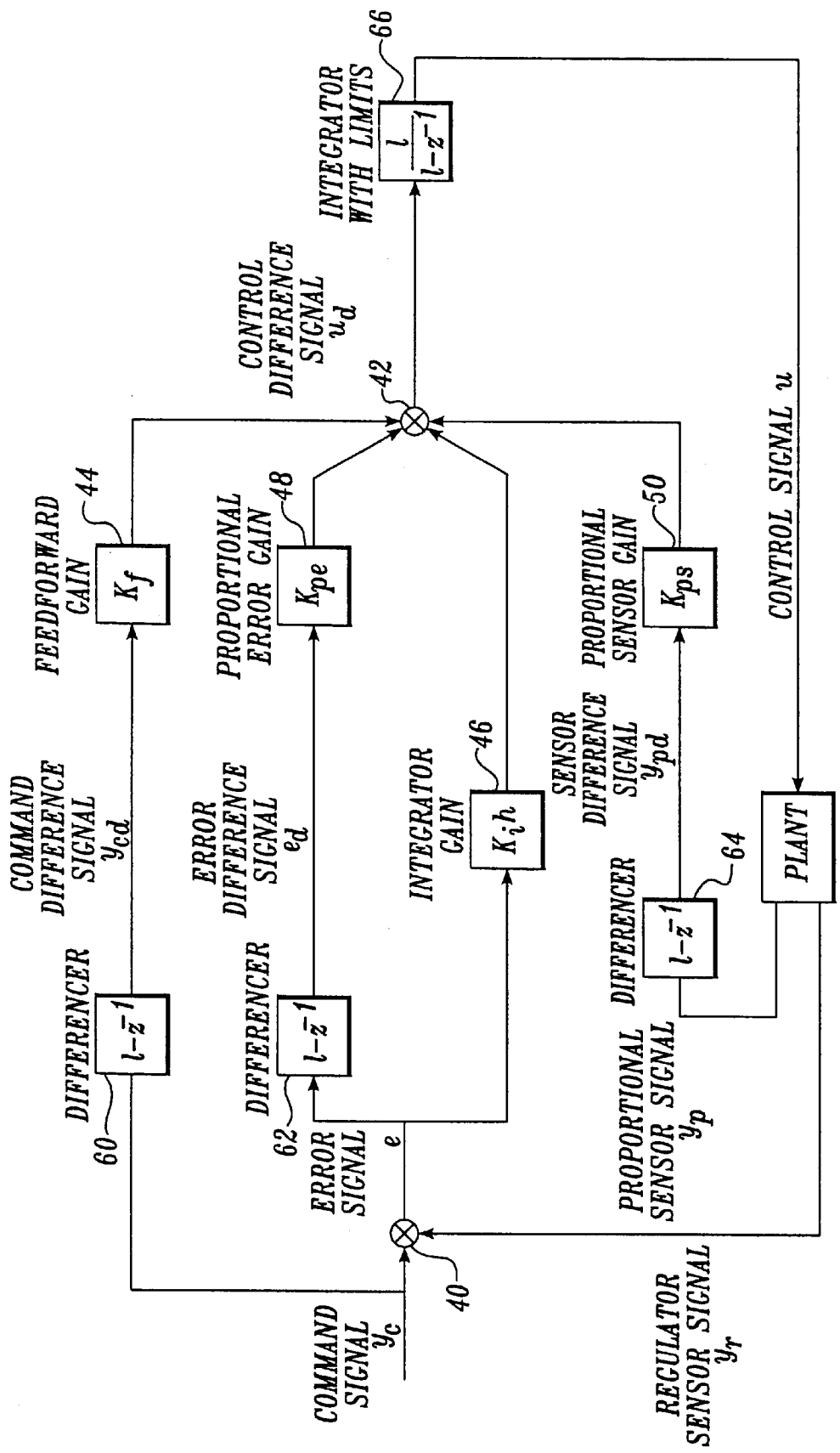
FIG. 4 is a control flow diagram illustrating antiwindup implementation aspects of a single-channel integrating control system formed in accordance with the present invention.

FIG. 4 illustrates one aspect of the present invention useful for eliminating SISO integrator windup behavior. Instead of integrating the error state variable e, the arrangement of FIG. 4 differences the inputs to the control signal to form a control difference signal $u_d$ and then integrates $u_d$ to form the control signal u. Control limits are placed directly upon the integrated control signal u as necessary.

To accomplish the above, a new differencer operator is introduced with transfer function 1-$z^{-1}$, to operate on three of the feedback and feedforward signals. The integrator of block 38 is eliminated and the integrator gain $K_i$ is multiplied by the discrete time step size h. Thus, in FIG. 4, the command signal $y_c$ is applied to the difference operator at block 60 to result in a command difference signal $y_{cd}$. The error signal e is applied to the difference operator at block 62 to result in an error difference signal $e_d$. The proportional sensor signal $y_p$ is applied to the difference operator at block 66 to result in a sensor difference signal $y_{pd}$. Functionally, the error difference signal $e_d$ is the difference between the current value of e and its previous value, i.e., $e_d(n+1)=e(n+1)-e(n)$. Similarly, the sensor difference signal $y_{pd}$ is the difference between the current value of $y_{pd}$ and its previous value, i.e., $y_{pd}(n+1)=y_p(n+1)-y_p(n)$. The command difference signal $y_{cd}$ is the difference between the current value of $y_{cd}$ and its previous value, i.e., $y_{cd}(n+1)=y_c(n+1)-y_c(n)$.

The control difference signal $u_d$ then contains the desired change between the new value of u and its previous value; i.e., $u_d=K_i h\, e+K_{pe}e_d+K_{ps}y_{pd}+K_f y_{cd}$, where h is the discrete-time step size. This signal $u_d$ is then integrated at block 66 using function $1/(1-z^{-1})$ to produce control signal u. Control limits may also be imposed directly upon u using the formula $u(n+1)=\mathrm{Lim}(u(n)+u_d(n+1))$, where the function Lim (·) represents the physical limits of the plant's control input. For example, if u is a rudder deflection that cannot exceed limits of ±30 degrees, the limit would be presented as Lim(u)=max(−30, min(u, 30)). The function Lim(·) can also impose slew rate limits by restricting the range of u to a prescribed interval centered on its previous value. The limits can be made functions of other physical parameters, such as dynamic pressure or angle of attack in aircraft applications.

The control system of FIG. 4 has input-output behavior identical to the conventional system under normal, non-saturated conditions. When control saturation occurs, however, the present invention control system produces no windup or overshoot behavior, and resumes normal linear operation immediately after saturation ends. In doing so, the need for special-purpose integrator freeze logic is also eliminated. The present invention is thus simpler and easier to design, and requires no significant additional computing throughput in the embedded control computer for a single-channel controller.

Figure 5:
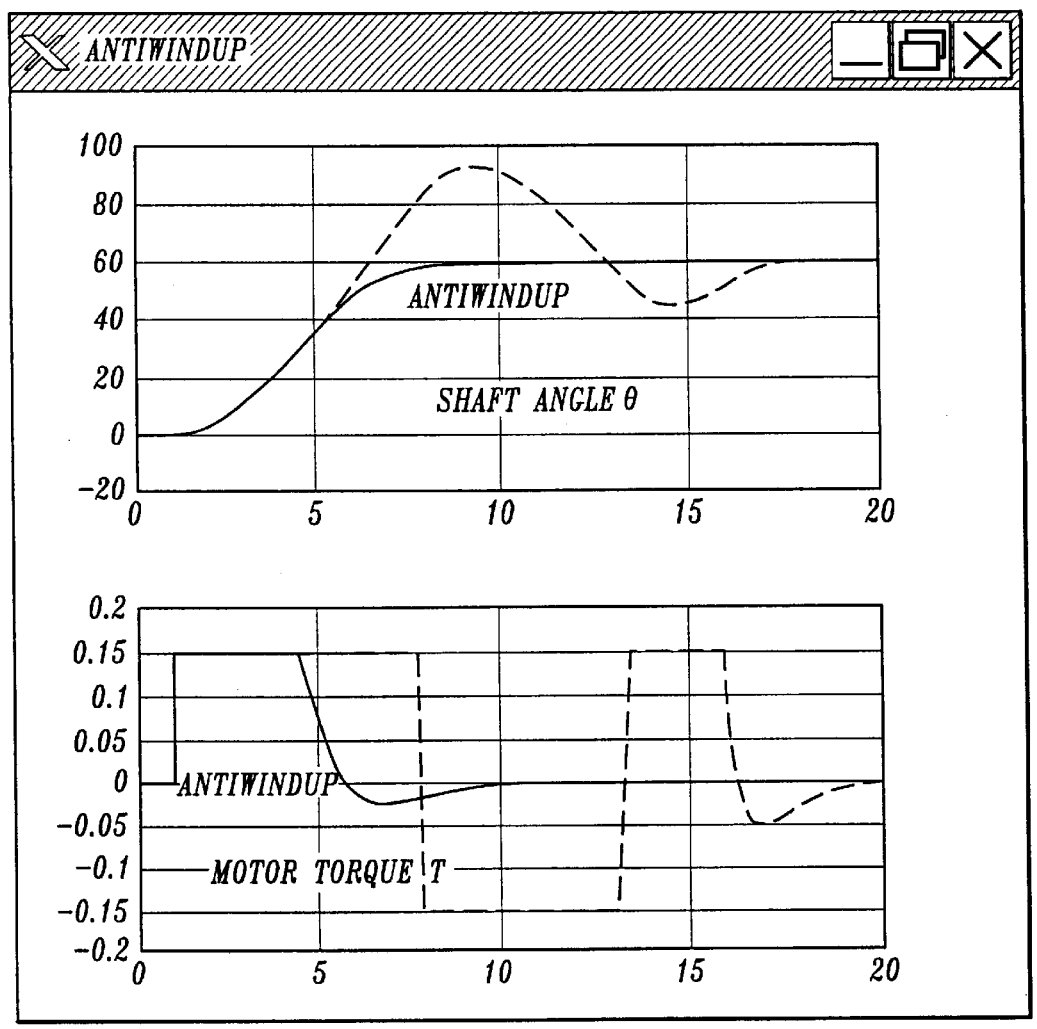
FIG. 5 is a series of time history plots illustrating the effects of a step input to an example rotary actuator using a control system formed in accordance with the present invention, particularly having the antiwindup aspects described in FIG. 4, the response of FIG. 3 shown in phantom for comparison.

FIG. 5 illustrates the time history plots illustrating the effects of a step input to the rotary motor servo example described above when using a control system formed in accordance with the present invention as described in FIG. 4, using the same plant, linear gains, limits, and command signal used earlier in FIG. 3. Portions of the response from FIG. 2 are shown in phantom for comparison. As shown in FIG. 5, the present invention antiwindup arrangement eliminates the occurrence of integrator windup entirely. The regulator sensor signal $y_r=\theta$ no longer overshoots its final value of 60 degrees, even though the control signal u remains saturated for three seconds. Because the integrator state $e_i$ is no longer present, the system response does not overshoot in order to unwind it to its steady-state value. Instead, the control u resumes its normal unsaturated linear response well before $\theta$ reaches its target value, and the linear zero-overshoot response is restored. The windup response of the conventional control implementation, shown earlier in FIG. 3, is shown in phantom in FIG. 5. The antiwindup implementation reaches equilibrium in 7 seconds, versus 5 seconds for the unsaturated case and 16 seconds for the conventional implementation. This is a dramatic improvement in system response.

Figure 6:
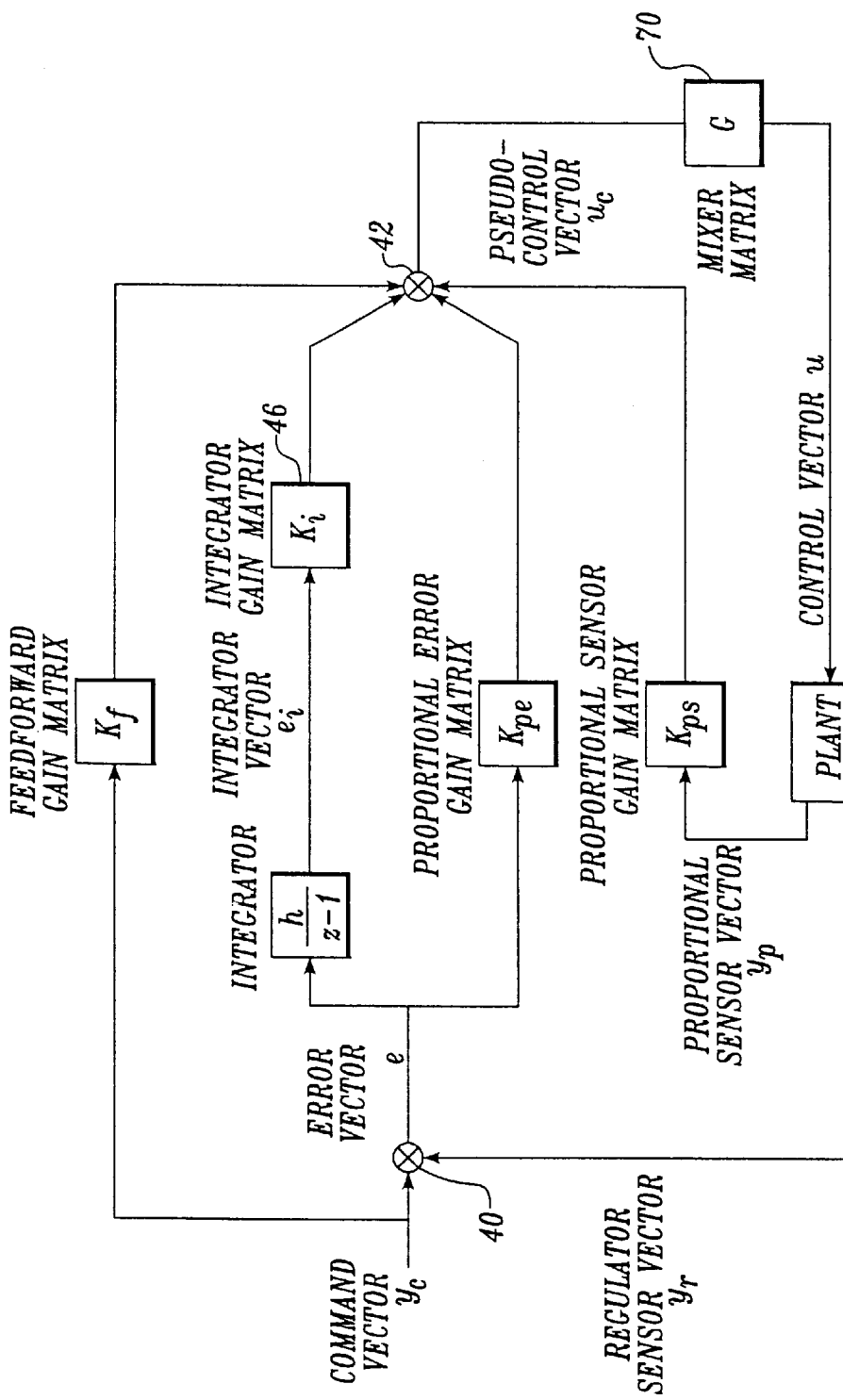
FIG. 6 is a control flow diagram of a conventional implementation of a multi-channel integrating control system.

FIG. 6 is a control flow diagram of a conventional implementation of a MIMO control system representative of the prior art. The input variables, $y_p$, $y_r$, and $y_c$, are provided as vectors, and the gains, $K_f$, $K_i$, $K_{pe}$, and $K_{ps}$, are provided as matrices. The output of the second combiner 42 is a pseudo-control vector $u_c$. An invertible mixer matrix G is applied at block 70 to the pseudo-control vector $u_c$ to result in the control vector u which is inputted to the plant. The mixer matrix G is provided to apply, or map, the pseudo-control vector signals $u_c$ onto the various control effectors available in the vector control signal u.

Figure 7:
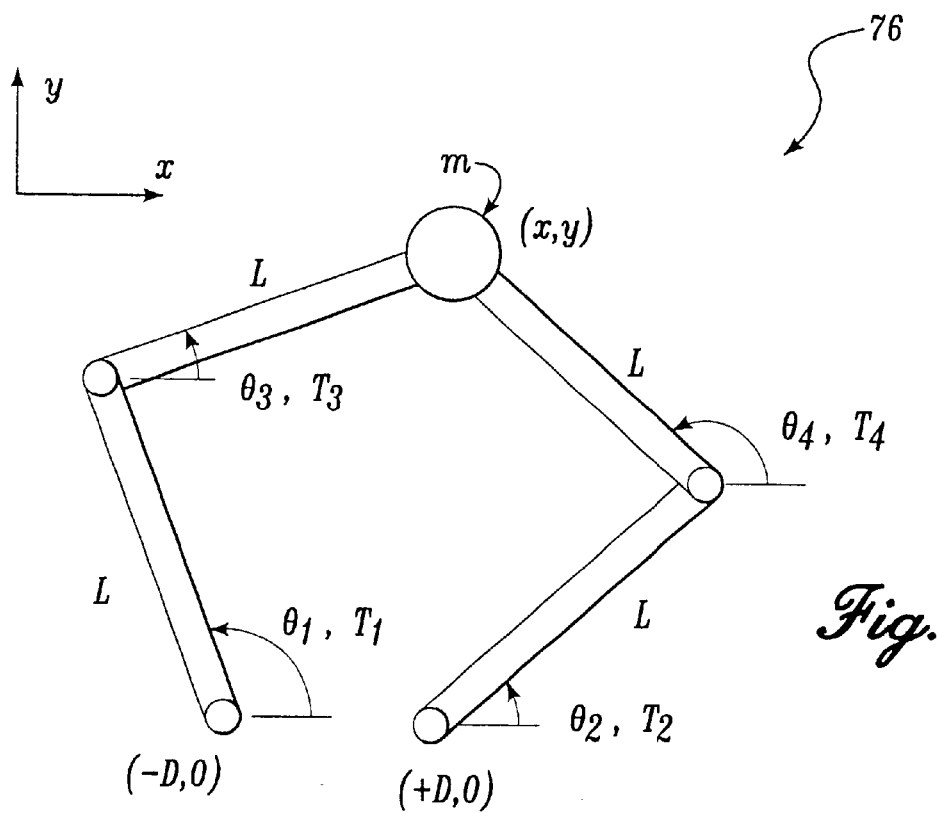
FIG. 7 is an example two-armed manipulator linkage.

To demonstrate the shortcomings of the control of FIG. 6, a two-armed robotic manipulator will be used. FIG. 7 illustrates such a manipulator 76 which is representative of a class of mechanical linkages used in manufacturing industries (e.g., the food industry) that do work on objects in the horizontal plane (e.g., food items passing by on a conveyor belt.) The object doing work is defined as having load mass m. A number of arm linkages of equal length L are connected end-to-end. The mass of each linkage arm is assumed negligible compared to the load mass m. The control inputs are counterclockwise moments $T_1$, $T_2$, $T_3$ and $T_4$. Moments $T_1$ and $T_2$ are applied by motors at the base or shoulder of each linkage, which have shaft angles $\theta_1$ and $\theta_2$ as shown. The linkage shoulders rotate but do not translate. Moments $T_3$ and $T_4$ are applied at the elbow joints, from which the load linkage arms extend at angles $\theta_3$ and $\theta_4$ as shown. The total x and y axis forces at the load mass can be derived as functions of $T_1$, $T_2$, $T_3$ and $T_4$, and the linkage angles. The linkages are hinged at each point marked with a filled circle, including at the load mass point (x,y). The motion is analogous to a person's arms moving with hands clasped.

Because this is a closed linkage, it has only two degrees of freedom. Once the load mass position (x,y) is set, all four linkage angles $\theta_1$, $\theta_2$, $\theta_3$, and $\theta_4$ are constrained. Thus the dynamic equations of motion for this model include only the load mass position and velocity as states. The linkage angles and their angular rates are then dependent variables. The two motor positions are at (x,y)=(−D,0) and (+D,0) as shown, and each linkage arm has equal length L.

The following formulas give the four linkage angles as functions of load mass position (x,y). The quantities $L_1$ and $L_2$ are the distances from each shoulder motor position to the load mass. The angles $\theta_7$ and $\theta_8$ are the angles from the positive x axis direction to the load mass m, as seen from the two shoulder motor positions. The angles $\theta_5$ and $\theta_6$ are the angles subtended between the elbow joints and the load mass, as seen from the shoulder motor positions.

$$L_1 = \sqrt{(x+D)^2 + y^2} \quad \theta_5 = \cos^{-1}\left(\frac{L_1}{2L}\right) \quad \theta_7 = \tan^{-1}\left(\frac{y}{x+D}\right)$$

$$L_2 = \sqrt{(x-D)^2 + y^2} \quad \theta_6 = \cos^{-1}\left(\frac{L_2}{2L}\right) \quad \theta_8 = \tan^{-1}\left(\frac{y}{x-D}\right)$$

$$\theta_1 = \theta_7 + \theta_5 \quad \theta_3 = \theta_7 - \theta_5$$

$$\theta_2 = \theta_8 - \theta_6 \quad \theta_4 = \theta_8 + \theta_6$$

For applied control moments $T_1$, $T_2$, $T_3$ and $T_4$, the x and y acceleration components of the load mass are given by:

$$m\ddot{x} = -\frac{T_1}{L}\sin(\pi - \theta_1 + \theta_3)\cos(\theta_3) +$$
$$\frac{T_2}{L}\sin(\pi + \theta_2 - \theta_4)\cos(\theta_4) - \frac{T_3}{L}\sin(\theta_3) - \frac{T_4}{L}\sin(\theta_4)$$

$$m\ddot{y} = -\frac{T_1}{L}\sin(\pi - \theta_1 + \theta_3)\sin(\theta_3) +$$
$$\frac{T_2}{L}\sin(\pi + \theta_2 - \theta_4)\sin(\theta_4) + \frac{T_3}{L}\cos(\theta_3) + \frac{T_4}{L}\cos(\theta_4)$$

The sines of the elbow hinge angles $\theta_{13}=\pi-\theta_1+\theta_3$ and $\theta_{24}=\pi+\theta_2-\theta_4$ determine the fractions of the shoulder control moments $T_1$, and $T_2$ that are transmitted to the load. These fractions are maximized when the hinge angles are 90 degrees. The sines and cosines of $\theta_3$ and $\theta_4$ determine the directions of the tension or compression forces transmitted to the load mass from the shoulder motors through the linkage arms. They also determine the directions of the forces transmitted to the load mass from the elbow motors, which act orthogonally to the tension and compression forces. The overall expression is linear in $T_1$, $T_2$, $T_3$ and $T_4$, so the acceleration components in x and y can be written conveniently in matrix-vector form:

$$\begin{bmatrix} \ddot{x} \\ \ddot{y} \end{bmatrix} = \begin{bmatrix} -\frac{1}{mL}\sin(\theta_{13})\cos(\theta_3) + \frac{1}{mL}\sin(\theta_{24})\cos(\theta_4) & -\frac{1}{mL}\sin(\theta_3) & -\frac{1}{mL}\sin(\theta_4) \\ -\frac{1}{mL}\sin(\theta_{13})\sin(\theta_3) + \frac{1}{mL}\sin(\theta_{24})\sin(\theta_4) & \frac{1}{mL}\cos(\theta_3) & \frac{1}{mL}\cos(\theta_4) \end{bmatrix} \begin{bmatrix} T_1 \\ T_2 \\ T_3 \\ T_4 \end{bmatrix}$$

$$\begin{bmatrix} \ddot{x} \\ \ddot{y} \end{bmatrix} = \begin{bmatrix} a_{11} & a_{12} & a_{13} & a_{14} \\ a_{21} & a_{22} & a_{23} & a_{24} \end{bmatrix} \begin{bmatrix} T_1 \\ T_2 \\ T_3 \\ T_4 \end{bmatrix} = F \begin{bmatrix} T_1 \\ T_2 \\ T_3 \\ T_4 \end{bmatrix}$$

By incorporating the pseudo inverse of the matrix F into the feedback gain matrix G for use in the control system of FIG. 6, or by otherwise solving the above equation for the desired accelerations, the control system can be made to compensate for the nonlinearity of the linkage geometry and to provide consistent closed-loop dynamics for all load mass positions. This form of nonlinear dynamic inversion is not required for an optimal controller formed in accordance with the present invention in general, but it is a useful technique and it serves to simplify this example.

Only the shoulder motor moments $T_1$ and $T_2$ are considered here in PART 1 so that the matrix inverse of the first two columns of F can be easily calculated for use in the control system. This provides a first description showing how to handle "square" plants, in which the number of controls equals the number of regulator channels. In PART 3 below, all four moments $T_1$, $T_2$, $T_3$ and $T_4$ are used, but with different priorities assigned via the Dailey L1 Optimization Algorithm cost function. PART 3 describes how to handle redundant controls by combining the output mixer techniques of PART 2 with the antiwindup, command limiting, and channel prioritization techniques of PART 1.

Thus, in FIG. 6 the control system command inputs in vector $y_c$ are $x_{com}$ and $y_{com}$, the desired x and y positions. Its outputs are the shoulder motor torques $T_1$ and $T_2$. For the conventional implementation, integrators are placed on the x and y position errors. The gains $K_i$, $K_{pe}$, $K_{ps}$, and $K_f$ in this multi-channel example are matrices, but their role is the same as in the single-channel case. Using the information above, the matrix $F_{12}$ is defined to consist of the first two columns of F. The mixer matrix G is defined as the inverse of $F_{12}$. The matrix G now maps the commanded x and y axis accelerations into the shoulder motor torques $T_1$ and $T_2$, assuming that elbow torques $T_3$ and $T_4$ are zero.

The system has six states: the positions x and y, their rates, and the two integrators on x and y tracking error. The feedback and feedforward gains are designed to provide a nominally decoupled response in the x and y axes, so that the x and y regulator channels each have 3 poles. Furthermore, the feedforward gains are to be designed to provide pole-zero cancellation as in the motor servo example, so that the nominal command response is that of a $2^{nd}$ order Bessel filter with zero overshoot. In this way, the unsaturated system will display zero overshoot and zero cross-axis coupling in its command response, so that any observed overshoot or cross-axis coupling can be attributed directly to saturation effects.

The transfer function is derived from the commanded to the actual position. Because the cross-channel response is nominally zero, the x channel equations may be used only. The y equations are identical in form. In terms of FIG. 6, the pseudo-control vector $u_c$ contains the commanded x and y accelerations. The control vector u contains the shoulder motor torques $T_1$ and $T_2$. The proportional sensor vector $y_p$ contains the x and y velocities. The reference sensor vector $y_r$ and command vector $y_c$ contain the actual and desired x and y positions.

$$y_r = \begin{bmatrix} x \\ y \end{bmatrix} \quad y_c = \begin{bmatrix} x_{com} \\ y_{com} \end{bmatrix} \quad y_p = \begin{bmatrix} \dot{x} \\ \dot{y} \end{bmatrix} \quad u_c = \begin{bmatrix} \ddot{x} \\ \ddot{y} \end{bmatrix} \quad u = \begin{bmatrix} T_1 \\ T_2 \end{bmatrix}$$

If the discrete-time integrator is formed in continuous time, the following integral-differential equation describes the closed-loop system in terms of x and $x_{com}$. Here the gains refer to the scalar x channel elements of the gain matrices. The y channel elements are set identically, and the cross-channel elements are set to zero in this example so that all the gain matrices except G are diagonal matrices.

$$\ddot{x} = K_i \int (x - x_{com}) dt + K_{pe}(x - x_{com}) + K_{ps}\dot{x} + K_f \ddot{x}_c$$

Applying the Laplace transform yields this transfer function from $x_{com}$ to x:

$$\frac{x}{x_{com}} = \frac{s(K_f - K_{pe}) - K_i}{s^3 - s^2 K_{ps} - s K_{pe} - K_i} = \frac{s+1}{(s+1)(s^2 + 1.732s + 1)}$$

To produce the desired target poles and zeros, the following gains are chosen: $K_i = -1.0$, $K_{pe} = -2.732$, $K_{ps} = -2.732$, and $K_f = -1.732$. The pole and zero at s=−1.0 cancel each other in the command response. The two remaining complex poles provide the desired Bessel filter step response. The complete set of gain matrices corresponding to FIGS. 1–7 are thus:

$$K_i = \begin{bmatrix} -1.000 & 0 \\ 0 & -1.000 \end{bmatrix} \quad K_{pe} = \begin{bmatrix} -2.732 & 0 \\ 0 & -2.732 \end{bmatrix}$$

$$K_{ps} = \begin{bmatrix} -2.732 & 0 \\ 0 & -2.732 \end{bmatrix} \quad K_f = \begin{bmatrix} -1.732 & 0 \\ 0 & -1.732 \end{bmatrix}$$

Figure 8:
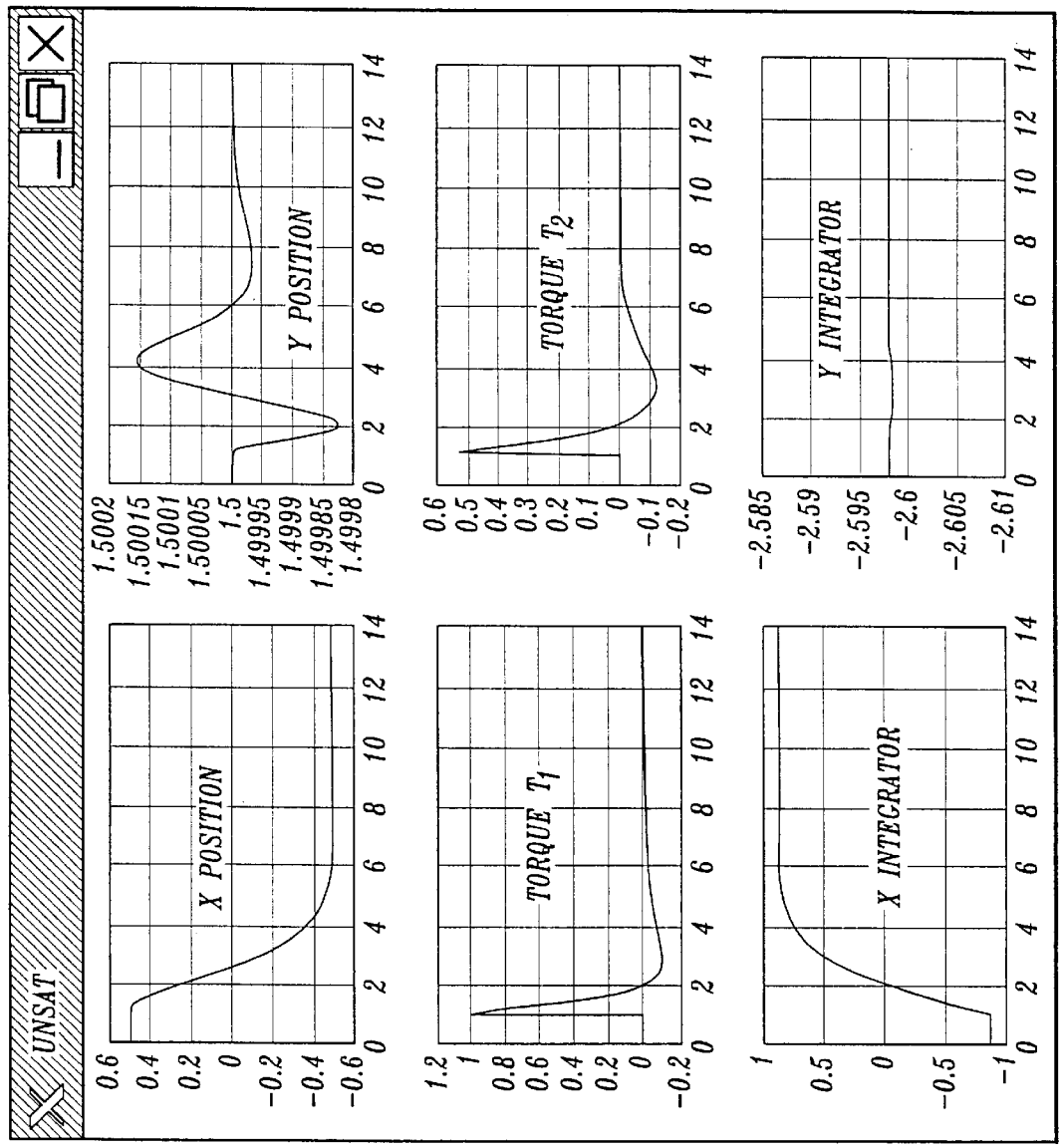
FIG. 8 is a series of time history plots illustrating the effects of a step input to the linkage example of FIG. 7 using a conventional multi-channel integrating control system with no control saturation.

FIG. 8 shows a set of time history plots for this 2-channel regulator when a large step command is introduced into the x channel, while the y position command is held constant. For these plots, the motor torque limits on $T_1$ and $T_2$ were set high so that no control saturation occurs. The system acquires its new commanded x position in about 5 seconds, with negligible movement in the y position. This illustrates the substantially decoupled nature of the nominal linear control system. The x integrator state moves to a new value in order to counteract the feedforward gain terms.

Figure 9:
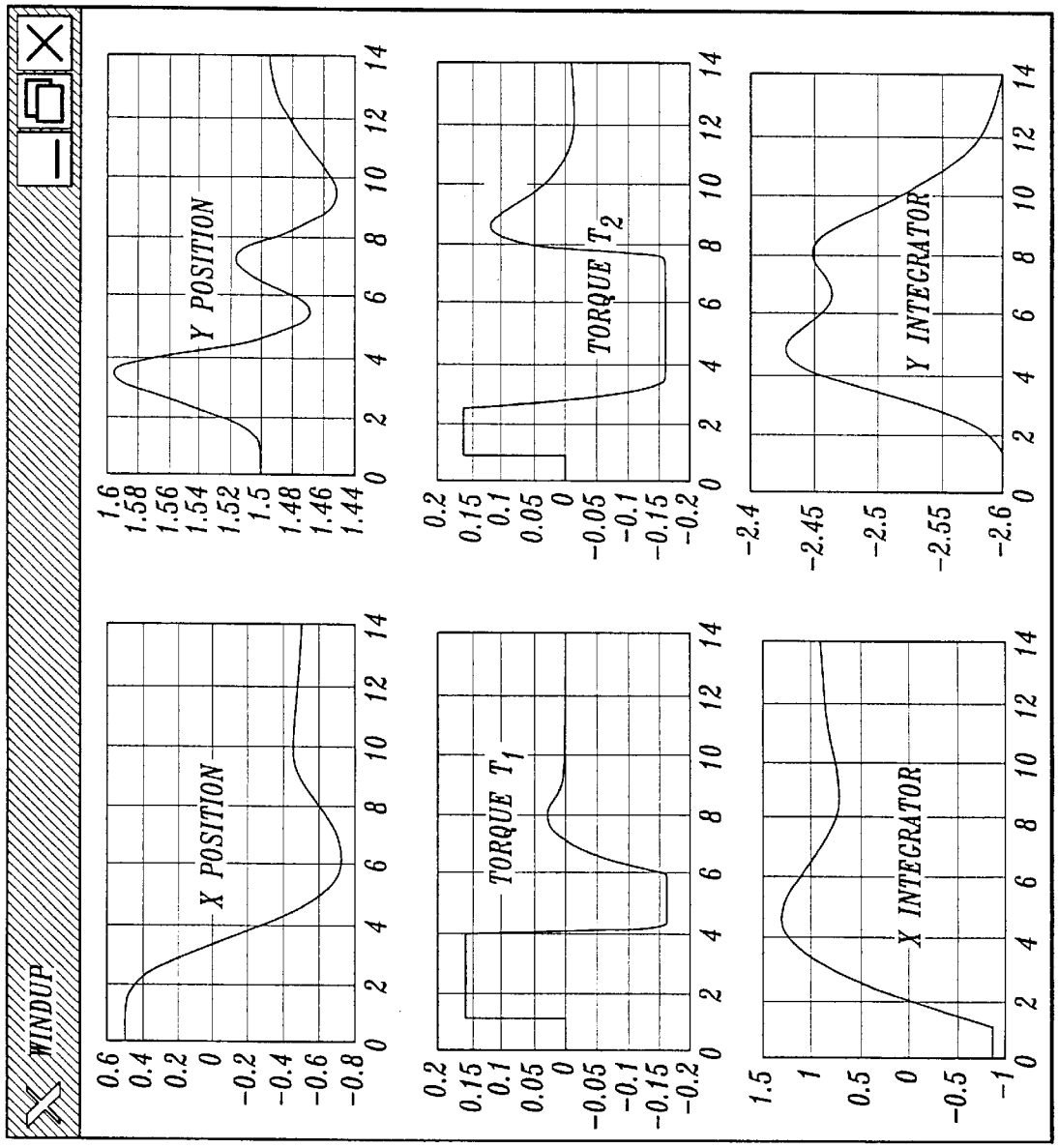
FIG. 9 illustrates the results of the linkage of FIG. 7 during control saturation, particularly illustrating integrator windup in a conventional multi-channel controller.

FIG. 9 shows the response of the same conventional multi-channel controller when control saturation and integrator windup occur. For this example, the saturation limits on motor torques $T_1$ and $T_2$ were set to ±0.16 N-m, to produce deep saturation relative to the unsaturated responses of FIG. 8. The x position overshoots its target value by about 20% of the total step size, and the y position is perturbed by about 10% of the x step size through cross-channel coupling. The x error integrator winds up well beyond its final steady-state value, causing the motor torques to remain in saturation for about 7 seconds, even as they reverse sign to bounce between their limits. The overall response takes about 13 seconds to approach equilibrium for this particular step command.

Figure 10:
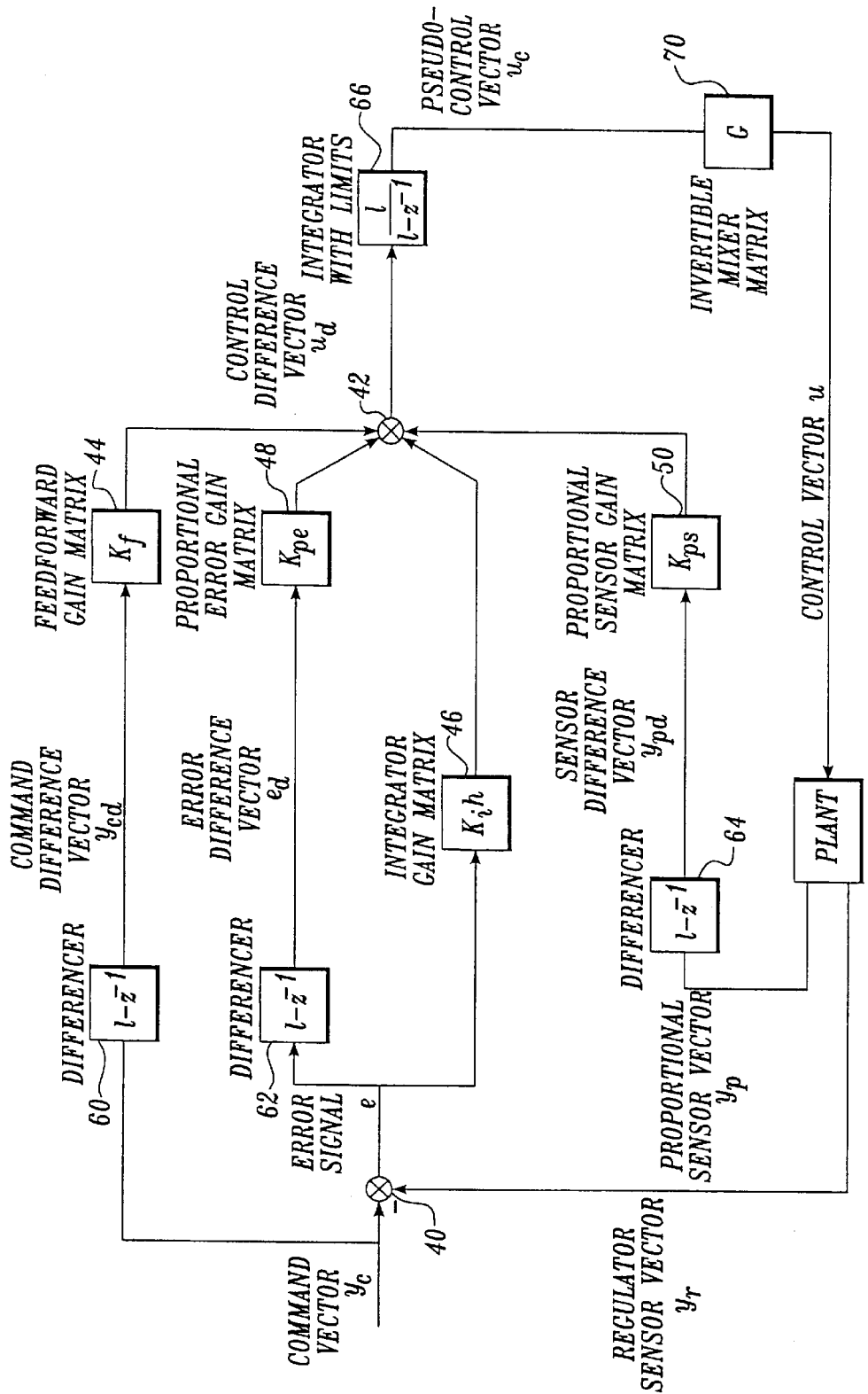
FIG. 10 is a control flow diagram illustrating the antiwindup implementation aspects of a square multi-channel integrating optimal control system formed in accordance with the present invention.

An arrangement similar to that in FIG. 4 can be used to eliminate integrator windup in multi-channel systems as well. FIG. 10 illustrates such a control system formed in accordance with the present invention suitable for square MIMO control problems (i.e., those with equal numbers of regulator channels as control actuators.) The system of FIG. 10 is similar to the system described with reference to FIG. 4 only with vector-valued signals for u, $y_r$, $y_c$, $y_p$, $y_d$, e, $e_d$, and $u_d$, and gain matrices rather than scalar real numbers for $K_{ps}$, $K_{pe}$, and $K_i$. As with the single-channel antiwindup controller, it is important to eliminate the explicit integrator states $e_i$ and instead to perform feedback integration directly on the control difference signal $u_d$.

A new pseudo-control output vector $u_c$ is used, in order to better handle cases in which the mixer matrix G is a smooth nonlinear function of the system state, as it is with the two-armed manipulator example above (i.e., G includes trigonometric functions of the linkage arm angles.) This pseudo-control vector, also called the command target vector herein, is used again in the general-purpose, non-square controller system described in PART 3 below. In order to prevent windup, the pseudo-control vector $u_c$ should accurately reflect the physical limits placed on the actual control vector u. The sequence of calculations to enforce this are:

$$u_{co}(n+1) = u_c(n) + u_d(n+1)$$
$$u = \text{Lim}(G\ u_{co})$$
$$u_c = G^{-1}\ u$$

The vector $u_{co}$ holds a temporary value of the incremented pseudo-control vector $u_c$. This is mapped to the physical controls through G, the limits are applied to produce u, and this is then mapped in reverse through $G^{-1}$ to enforce u=G $u_c$. This requirement for an invertible G is what restricts this technique to square controllers. PARTS 2 and 3 describe how to handle non-square controllers.

Figure 11:
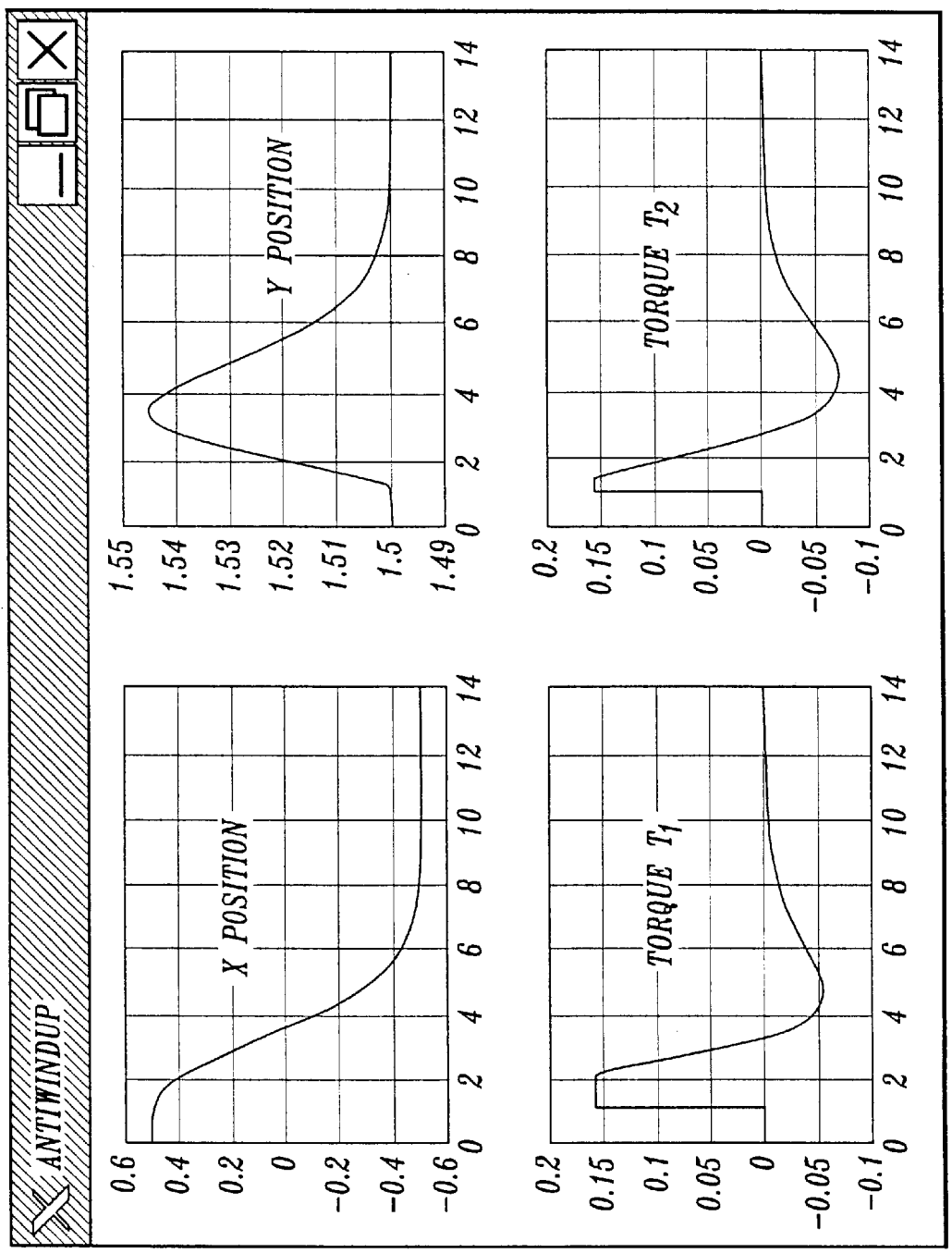
FIG. 11 is a series of time history plots illustrating the effects of a step input to an example linkage using an optimal control system formed in accordance with the present invention, particularly having the antiwindup aspects described in FIG. 10.

FIG. 11 is a series of time history plots illustrating the effects of a step input to the example linkage described above, only using a control system formed in accordance with the present invention as described in FIG. 10. All feedback gain matrices, control limits, initial conditions, and commands are the same as those used to generate FIG. 9 with the conventional controller structure. The improvement in response is dramatic. The controller now tracks and acquires the x position step command with no significant overshoot, and does so in about 8 seconds, versus 14 seconds for the conventional controller and 5 seconds for the unsaturated response. The motor torques remain in saturation for only about 1 second, versus 7 seconds for the conventional controller.

The behavior under control saturation is acceptable for many multi-channel controller applications; however, there is one undesirable artifact of saturation in the response. The presence of saturation still introduces cross-channel coupling even though integrator windup has been eliminated. In this example, the shoulder motor torques $T_1$ and $T_2$ do not have a one-to-one correspondence with the x and y position variables. Moving only x without disturbing y, as in this example, requires the coordinated use of both motors, as FIGS. 8 and 11 illustrate. In FIG. 11, the y position is perturbed by about 5% of the x step command size, even though the y command is constant.

For applications in which cross-channel coupling is unacceptable, or in which the regulator channels must be prioritized, L1 optimization (described in detail below) can be introduced to the controller to eliminate the cross-channel coupling and provide relative prioritization of channels. In some cases, it may also be desirable to assign priorities to the regulation channels, so that transient tracking errors from saturation are confined to the least-important channels when possible. In aircraft, for example, tight regulation of sideslip angle might be considered more important than roll rate error. Handling of cross-channel coupling and channel prioritization in multichannel regulators is addressed with reference to FIG. 12.

Figure 12:
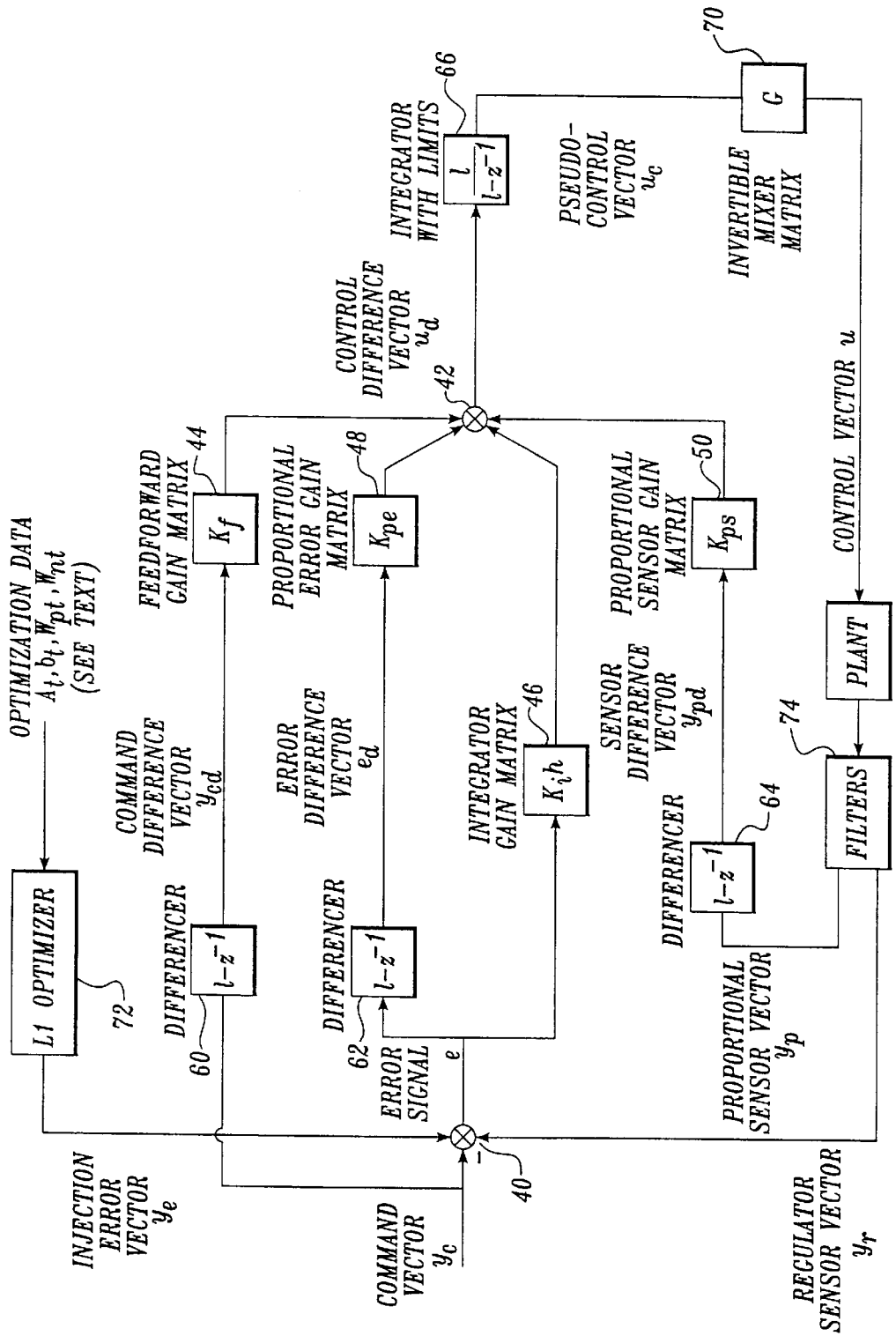
FIG. 12 is a control flow diagram illustrating a general implementation of a square multi-channel optimal control system having antiwindup, L1 automatic command limiting, and channel prioritization aspects all formed in accordance with the present invention.

FIG. 12 shows a general-purpose multi-channel control system, using vector signals and matrix gains. The significant aspect of FIG. 12 is the introduction of an injected command error input signal vector $y_e$ to be combined with the command signal vector $y_c$ at the first combiner 40. Thus, error vector e is now $e=y_r-y_c+y_e$. The proportional error gain matrix $K_{pe}$ and integrator gain matrix $K_i$ apply feedback to the error vector e to drive it to zero in the steady state.

The injected command error input signal vector $y_e$ is provided by an Optimizer in block 72. During command saturation, the Optimizer provides an injection error signal that will alter the error signal so that the downstream control signal used by the plant will result in the desired prioritization and limiting of effector movement (and hence the desired lack of cross-channel coupling in regulator motions.) The Optimizer does this by attempting to produce the smallest injection error signal that will prevent the system from exceeding its constraints.

This vector $y_e$ provides a powerful way to simultaneously prevent cross-channel coupling and provide channel prioritization. The Optimizer solves for the smallest possible injection error signal $y_e$ that will satisfy all constraints. The Optimizer considers the restraints of channel prioritization and effector limits and feeds the compensating element into the control system as an input to the formation of the control signal u itself This is somewhat akin to "cheating on the answer" since the Optimizer considers the effect that various inputs will have on the system and provides a compensating factor to the other system components in an amount that will alter the plant's response to give an optimal response.

The Optimizer uses the Dailey L1 Optimization Algorithm which includes a cost function, J. (The Optimizer is also referred to herein as an "L1 Optimizer", meaning a computer program or electronic component that incorporates the Dailey L1 Optimization Algorithm in providing an optimized output in response to the inputs provided.) A minimum J corresponds to the best possible injection error available (i.e., the least amount that will keep the total error e below the maximum acceptable error) given the channel prioritizations between effectors. Under normal, non-saturated conditions, the optimal error is $y_e=0$, and normal linear behavior occurs. During saturation, the optimal $y_e$ vector can assign all the tracking error to the lowest priority regulator channels when possible.

In addition to $y_e$, the arrangement of FIG. 12 also introduces one or more filters at block 74 to process plant output signals. Any dynamic states in the control system (except integrators) are included in the filters. Examples include Kalman filters, other state estimator filters, complementary filter pairs, lead-lag compensation filters, and sensor notch filters. The addition of the filters allows the system to accommodate all dynamic control types, in addition to PI (proportional-integral) structures. The filters provide as outputs the regulator sensor vector $y_r$ and the proportional sensor vector $y_p$.

Figure 13:
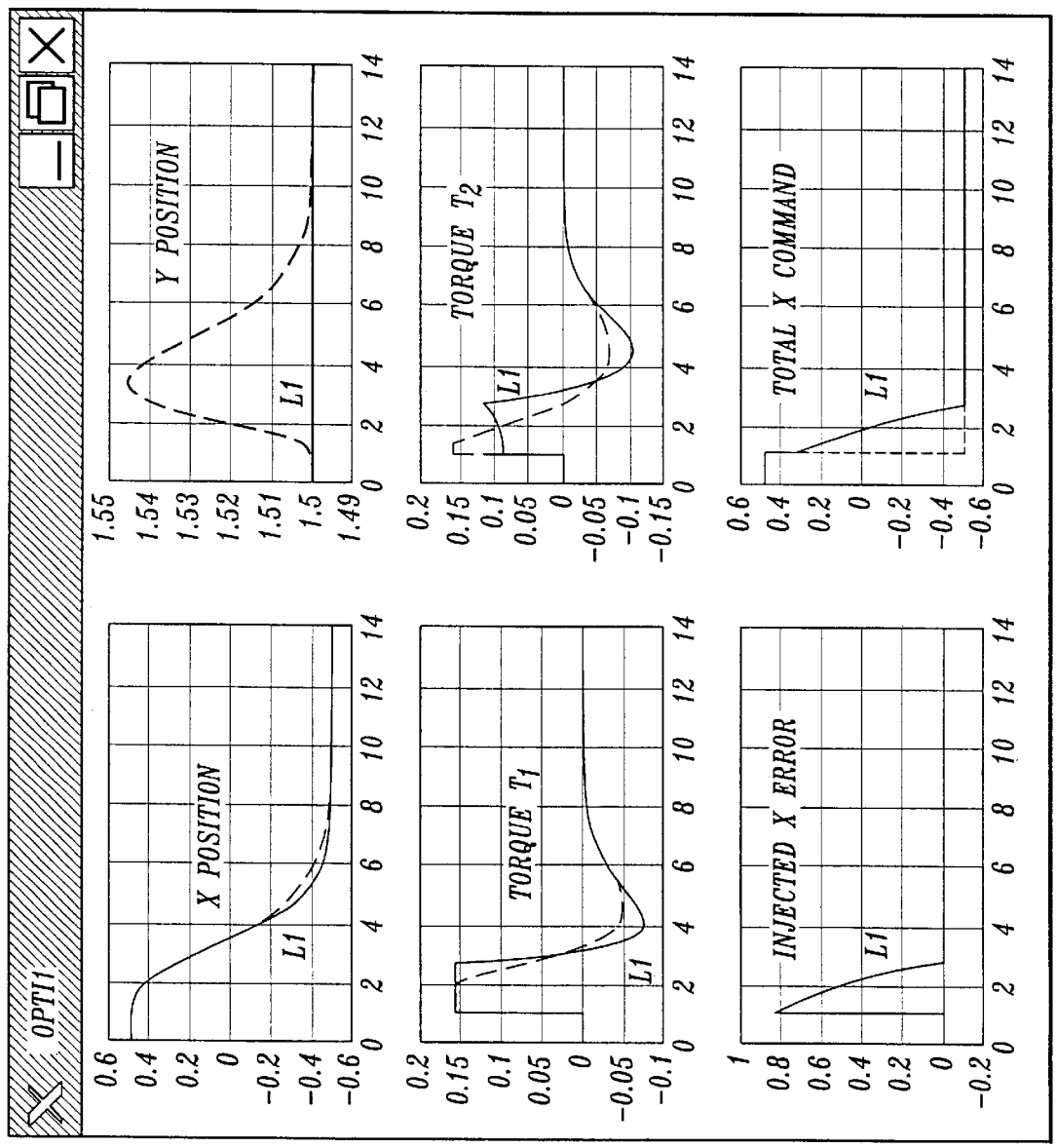
FIG. 13 is a series of time history plots illustrating the effects of a step input to an example linkage using an optimal control system formed in accordance with the present invention, particularly having the antiwindup aspects described in FIG. 12, the response of FIG. 11 being shown in phantom for comparison.

FIG. 13 is a series of time history plots illustrating the effects of a step input applied to the same two-armed manipulator example discussed earlier. In this case, the Optimizer is used to calculate the injection error $y_e$ and to prevent regulation errors from appearing in a "high priority" y position channel during saturation. All other command signals, limits, and gain matrices are identical to those used in FIGS. 11 and 9. The antiwindup controller response without optimization, also plotted in FIG. 11, is shown in phantom for comparison.

The cross-axis coupling disturbance to the y position channel is completely eliminated. Examining the motor torque commands shows how the injected x channel error causes the $T_2$ motor torque to stop short of its actual saturation limit. Instead, $T_2$ rides along a constraint boundary that corresponds to zero y axis acceleration, which the L1 optimizer calculates implicitly at each time step. The difference between the x step command and the calculated injection error for x is plotted to show how, in effect, the total x command is made to ramp gently to its final value, rather than stepping there instantaneously.

Superficially, this behavior may appear to be similar to that provided by known "easy-on" command limiting methods (such as placing a fixed rate limit on the x command before it enters the feedback loop.) However, they are not the same. There are several significant differences. First, the present invention control system uses the L1 Optimizer to find the true limits of system performance automatically, by solving the constraint equations directly. In the linkage example, torque $T_1$ remains fully saturated during the time that the x injection error is nonzero. This means the system is accelerating x as fast as possible subject to the constraint that y remain undisturbed. A fixed command rate limit cannot achieve maximum system performance in this way— it will degrade system performance instead. Designing fixed command rate limits is a trial-and-error process for this reason.

Second, the L1 Optimizer provides channel prioritization together with command limiting. In the linkage example, the penalty weight on injected y error was made ten times higher than the penalty on x error, so that y regulation has a higher priority than x. This capability can be important for reasons of safety and system performance requirements. Third, a fixed command rate limit can only protect against abrupt command inputs, but offers no protection against abrupt system disturbances. For example, an aircraft is subject to sudden gusts and turbulence. A control system should preferably respond in a robust manner against unplanned disturbances. The present invention optimal control system which incorporates the L1 Optimizer provides this protection by acting on the system's actual state, not just its operator's The detailed description of the Dailey L1 Optimization Algorithm is given in PART 4. Formulation of its optimization elements for use in a MIMO control setting to eliminate cross channel coupling is as follows. The cost function J for real-time L1 optimization is formulated as:

$$J = \sum_{i=1}^{r} W_{ei}|y_{ei}| + \sum_{i=1}^{m} W_{pi}\max(0, u_i - u_{ui}) + \sum_{i=1}^{m} W_{ni}\max(0, u_{li} - u_i)$$

where

| | |
|---|---|
| r | number of elements in $y_e$ |
| m | number of elements in u |
| $y_{ei}$ | ith element of $y_e$ |
| $u_i$ | ith element of u |
| $u_{di}$ | ith element of $u_d$ |
| $u_{ui}$ | upper bound of control signal $u_i$ |
| $u_{li}$ | lower bound of control signal $u_i$ |
| $W_{ei}$ | penalty weight on $y_{ei}$ |
| $W_{ui}$ | penalty weight on upper bound $u_i$ |
| $W_{li}$ | penalty weight on lower bound $u_i$ |

The optimal value of $y_e$ is calculated at each time step to minimize J. Because the control difference vector $u_d$ depends upon $y_e$ through the $K_{pe}$ and $K_i$ gain matrices, this technique automatically accounts for the gains, even in gain-scheduled control systems where the gain matrices change continually.

The cost function J is piecewise-linear since it contains absolute value and maximum functions. The first term penalizes the absolute values of the injection error vector elements. By assigning the $W_{ei}$ penalty weights, relative priorities are placed upon each regulator channel. For example, one degree of sideslip error might incur the same cost penalty as fifty degrees per second of roll rate error. The second term penalizes the control vector u when its elements exceed their upper bounds uui. The $W_{pi}$ weights are typically set to large values, relative to $W_{ei}$, in order to enforce the control bounds. The third term similarly penalizes the elements of u when they exceed their lower bounds $u_{li}$.

When the control vector u is not saturated, the optimal solution is $y_e=0$, the optimal cost J is zero, and the nominal linear response remains in effect. When the control vector u is saturated, the optimal solution $y_e$ will offset or "back off" the operator's commands in $y_c$ just enough to keep the control vector u at the saturation boundary. This keeps the control system from overdriving the control effectors, which overdriving may break the feedback loop and cause instability in some conventional control systems.

The control difference vector $u_d$ depends upon the unknown injection error vector $y_e$ through the formula derived below. The vector $e_{old}$ refers to the value of e from the previous time step. The vector $u_{c,old}$ is the value of $u_c$ from the previous time step.

$u_d = K_i h e + K_{pe} e_d + K_{ps} y_{pd} + K_f y_{cd}$ $e = y_r - y_c + y_e$ $e_d = e - e_{old}$ $u_d = (K_i h + K_{pe}) y_e + (K_i h + K_{pe})(y_r - y_c) - K_{pe} e_{old} + K_{ps} y_{pd} + K_f y_{cd}$ $u = G(u_{c,old} + u_d)$ Using the above matrix formula for $u_d$, the cost function J can be represented in the basic matrix form used by the L1 Algorithm. The basic form for J is given by:

$$J = \sum_{i=1}^{r} W_{pti} \max(0, e_{ti}) + \sum_{i=1}^{r} W_{nti} \max(0, -e_{ti})$$

where $e_t = A_t x_t + b_t$

Here the elements of the vectors $W_{pt}$, $W_{nt}$, and $e_t$ are given by $W_{pti}$, $W_{nti}$, and $e_{ti}$ respectively. The unknown solution vector $x_t$ is, in this case, simply the injection error vector $y_e$. The vectors $W_{pt}$, $W_{nt}$, $e_t$, and $b_t$, and the matrix $A_t$ are defined in terms of the control system vectors and matrices as follows:

$$W_{pt} = \begin{bmatrix} W_e \\ W_p \\ 0 \end{bmatrix} \quad W_{nt} = \begin{bmatrix} W_e \\ 0 \\ W_n \end{bmatrix} \quad e_t = \begin{bmatrix} y_e \\ G(u_{cold} + u_d) - u_u \\ G(u_{cold} + u_d) - u_l \end{bmatrix}$$

$$A_t = \begin{bmatrix} I \\ G(K_i h + K_{pe}) \\ G(K_i h + K_{pe}) \end{bmatrix}$$

$$b_t = \begin{bmatrix} 0 \\ -u_u + G(u_{cold} + (K_i h + K_{pe})(y_r - y_c) - K_{pe} e_{old} + K_{ps} y_{pd} + K_f y_{cd}) \\ -u_l + G(u_{cold} + (K_i h + K_{pe})(y_r - y_c) - K_{pe} e_{old} + K_{ps} y_{pd} + K_f y_{cd}) \end{bmatrix}$$

Using this matrix problem description, the L1 Algorithm can solve the equation $e_t = A_t x_t + b_t$ for the vector $x_t$ that minimizes J, thereby finding the optimal injection error vector $y_e = x_t$. The Algorithm takes $W_{pt}$, $W_{nt}$, $A_t$, and $b_t$ as inputs, and returns the optimal vector $y_e$. The Algorithm also requires upper and lower bounds on $x_t$, which should be set to large values in this case, since it is the bounds on u that should dominate the solution. PARTS 2 and 3 describe how to formulate L1 optimization elements for output mixers and non-square optimal controllers using the same input matrices and vectors.

The SISO and MIMO present invention control systems described above can be used in a multitude of different applications. Because the systems are so robust and can provide such fast accurate control responses, they are particularly well suited to aerospace applications.

As will be appreciated from a reading of PART 1, the aspects of the present invention relating to the prevention of integrator windup and cross-channel coupling during control saturation provide a significant advantage for both single and multichannel systems. These aspects also provide automatic command limiting and prioritization of regulator channels, while exploiting the full limits of available control power from all control effectors. Under quiescent, small-perturbation conditions, the present invention control system produces responses identical to those of traditional linear controllers. However, when large commands or system disturbances appear, causing control saturation and other nonlinear limiting effects, the L1 Optimizer acts automatically to prevent a range of undesirable effects that have long plagued linear controllers under these conditions. It also provides these benefits in a single general-purpose structure without requiring labor-intensive special-purpose embedded code to be written, as has been necessary to prevent these problems on a case-by-case basis in the past.

In addition, the present invention handles position and rate saturation of control effectors, provides output mixer function for redundant multiple control effectors, imposes equality and inequality constraints on controls and states, reconfigures automatically after known control effector failures, automatically limits large input commands to respect control limits, and switches between active constraints without special mode switching logic.

PART 2

In addition to the above control system improvements to eliminate integrator windup and its associated problems, the present invention includes aspects relating to the allocation of control responses between different control effectors and regarding the application of limits to those control outputs. The problem with conventional output mixing arrangements is their inability to exploit the full range of possible combined control effector movements. As before, a description of the prior art using an example application is provided as a way to illustrate this shortcoming. The output mixer aspects of the present invention are described thereafter, with reference to FIGS. 17–19.

Figure 14:
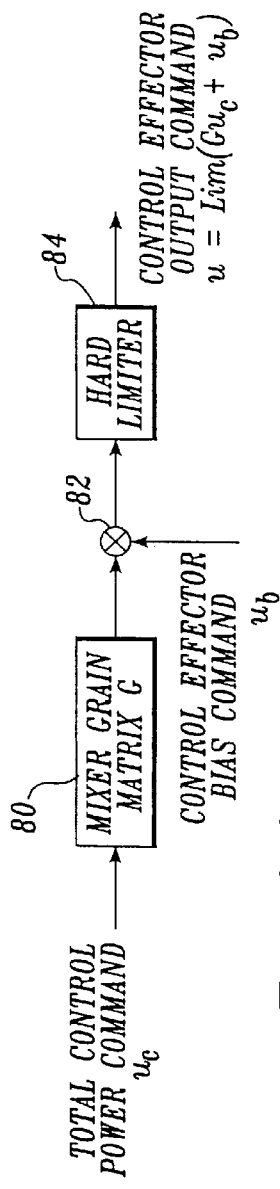
FIG. 14 illustrates a conventional gain matrix output mixer structure.

FIG. 14 is a diagram of a conventional gain matrix output mixer for allocating controls and applying limits to the outputs. The total control power command $u_c$ (represented in vector form) is multiplied by the gain matrix G at block 80 to produce a command for each control effector. The result is often summed at a third combiner 82 with a set of reference bias command values $u_b$ (e.g., "trim" commands in the aerospace industry) for each effector. These signals $u_b$ provide nominal effector commands when the control power commands $u_c$ are zero. The combination is subject to a hard limiter function at block 84 that reflects the physical limits of each control effector. The output of the mixer is therefore a control effector command vector signal u, where u=Lim(G $u_c+u_b$). Each signal element of the vector u has its own independent upper and lower bounds, which are applied by the Lim(·) function.

Figure 15:
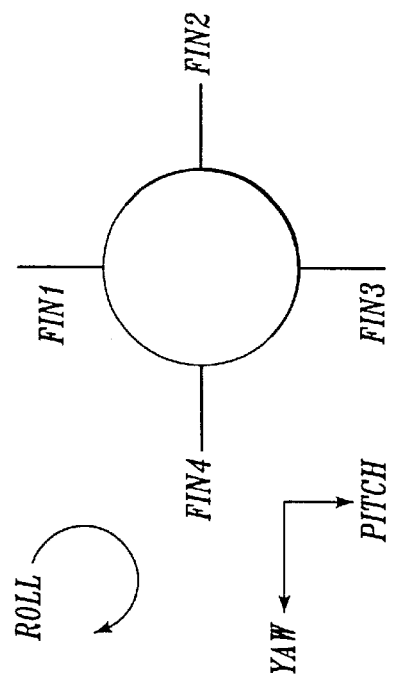
FIG. 15 illustrates a cruciform arrangement of missile tail fins.

To illustrate the shortcomings of the prior art output mixer shown in FIG. 14, the simplified missile example illustrated in FIG. 15 will be used. A set of four control fins (fin1, fin2, fin3, fin4) are arranged at the missile tail in a cruciform pattern and are the control effectors of the missile. FIG. 15 illustrates a view of the four fins from the rear of the missile. These four control effectors can be deflected by servos to produce three control power effects—roll, pitch, and yaw moment. The missile control system includes an output mixer such as the one illustrated in FIG. 14 to map roll, pitch, and yaw commands into deflection commands for the four fins. A positive deflection of each fin produces a force in the clockwise direction. Combined forces and moments in the directions illustrated in FIG. 15 correspond to positive roll, yaw, and pitch moments for the missile as shown.

With these definitions, the command target matrix F, given below, maps the four fin deflections into pitch, roll, and yaw moments. There are three output rows, but four input columns, because there are more controls than there are desired moments. Systems with such redundant control effectors are commonly encountered. For simplicity, it is assumed that all fin deflections are limited to the ±1 unit range. The matrix elements are also normalized to values of 1, 0, and −1 for simplicity.

$$\begin{bmatrix} roll \\ yaw \\ pitch \end{bmatrix} = \begin{bmatrix} +1 & +1 & +1 & +1 \\ -1 & 0 & +1 & 0 \\ 0 & +1 & 0 & -1 \end{bmatrix} \begin{bmatrix} fin1 \\ fin2 \\ fin3 \\ fin4 \end{bmatrix} = F \begin{bmatrix} fin1 \\ fin2 \\ fin3 \\ fin4 \end{bmatrix}$$

A conventional mixer gain matrix G simply consists of the Moore-Penrose pseudo-inverse of this matrix F, which can be calculated by $G=F^T(F F^T)^{-1}$, where $F^T$ is the transpose of F. This matrix maps the three desired moments into the four fin deflections. The pseudo-inverse yields the smallest set of fin deflections that produce the desired moments, as measured by the 2-norm or root sum of squares.

$$\begin{bmatrix} fin1 \\ fin2 \\ fin3 \\ fin4 \end{bmatrix} = \begin{bmatrix} +0.25 & -0.5 & 0 \\ +0.25 & 0 & +0.5 \\ +0.25 & +0.5 & 0 \\ +0.25 & 0 & -0.5 \end{bmatrix} \begin{bmatrix} roll \\ yaw \\ pitch \end{bmatrix} = G \begin{bmatrix} roll \\ yaw \\ pitch \end{bmatrix}$$

Thus, input commands to the plant are based on a gain matrix that can be made to weigh the various inputs depending on a predefined value system.

Figure 16:
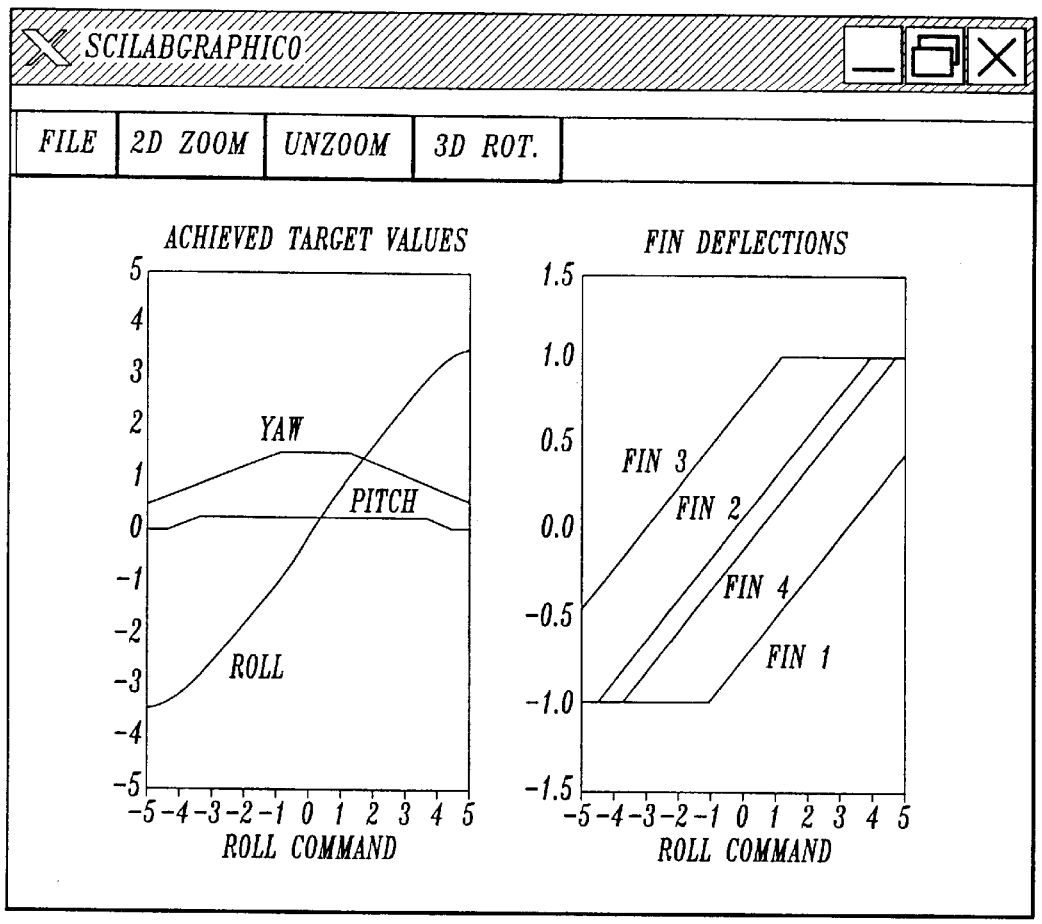
FIG. 16 illustrates moments and fin deflections for the conventional fin mixer of FIG. 15.

FIG. 16 illustrates the results of sweeping through a range of roll commands using the conventional output mixer of FIG. 14 and using the matrix G given above with clipping limits of ±1 unit on each fin. The yaw command is fixed at +1.5 and the pitch command is fixed at +0.2, while the roll command sweeps from −5 to +5. For roll commands in a neighborhood centered at zero, the mixer delivers the requested roll, pitch, and yaw moments simultaneously. However, when the roll command magnitude exceeds 1.0, the fin deflections begin to saturate, and errors are introduced in the resulting moments. For this particular choice of commands, the achieved yaw moment begins to drop toward zero as the roll command magnitude increases above 1.0. Eventually, the pitch moment also drops when the roll command magnitude exceeds 3.6. The achieved roll moment is no longer equal to the commanded value, having a reduced magnitude, so that the roll response plot looks like a curve instead of a straight line. Actually, all the responses are piecewise-linear, but a series of closely-spaced saturation "events" gives it a curved appearance.

When a feedback control system is used with a conventional output mixer, such as the one of FIG. 14, the moment target errors for large input commands can have undesirable effects on system stability and performance. Cross-channel coupling and tracking errors are produced when uncommanded changes in yaw and pitch moments appear in response to roll commands. These errors degrade the tracking performance. Failure to provide the full requested roll moment also degrades stability, because the incremental gain of the system is reduced. A typical approach to avoiding these undesirable effects is to restrict the inputs to the mixer so that the output stays within the linear region. For this example, the roll command would have to be restricted to the ±1 range, even though the fins are capable of producing roll moments in a ±4 range. Thus, the control power envelope has been restricted to 25% of its true limits.

In accordance with aspects of this invention, an L1 Optimizer can be used in a controller to distribute a set of total control power commands, such as total forces or moments, among a larger, redundant set of control effectors, while enforcing the position and rate limits of each control effector, and while imposing additional equality and inequality constraints on the control effector commands. This allows the plant's full range of achievable control power to be exploited by a controller. Priorities can be placed automatically upon the use of different control effectors, so that some become "primary" controls to be used first, with the other "secondary" controls to be used when the primary controls have saturated. Also, priorities can be placed upon the achievement of the total control power commands. For example, an output mixer for producing roll, yaw, and pitch moment could be prioritized to trade off yaw in favor of roll, or vice versa. Such prioritizations of control effectors and control power commands are similar to the prioritization of regulator channels described in PART 1, and are achieved using the L1 cost function weights.

To accomplish this, the L1 Optimizer solves directly for control deflections using the F matrix, instead of applying a prestored pseudo-inverse G matrix that becomes invalid under control saturation. To produce a well-posed optimization problem, additional constraint signals are added to penalize undesirable control activity so that a unique optimal solution is defined. In general, there must be at least as many rows (constraints) in the F matrix as there are columns (controls). Otherwise, there could be an infinite number of solutions all producing the same cost function value.

Figure 17:
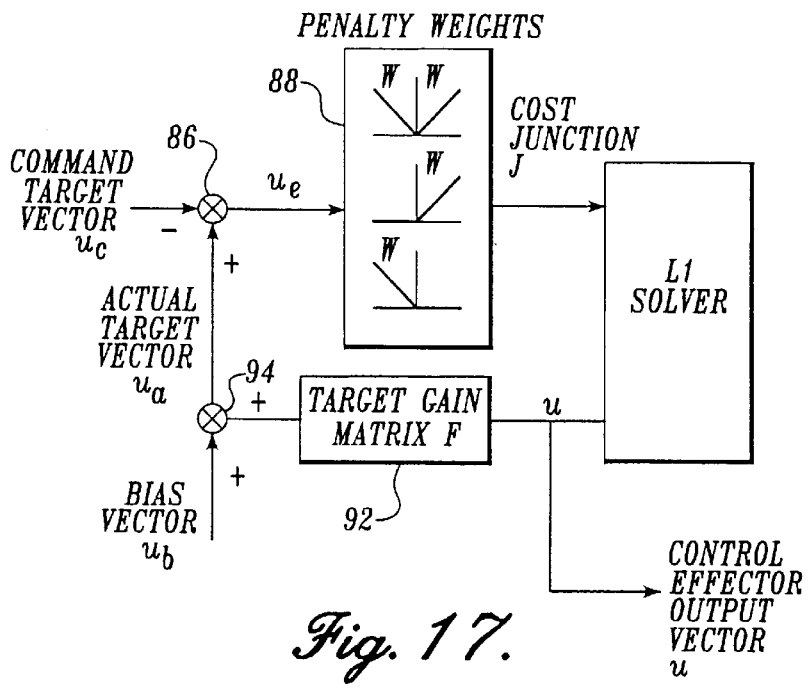
FIG. 17 is a control flow diagram illustrating the output mixing implementation aspects of an optimal control system formed in accordance with the present invention.

FIG. 17 is a diagram of an embodiment of an L1 Optimizer for use in output mixing. Its primary input signal is the commanded target vector $u_c$, containing the desired values for all the target quantities produced by the control effectors. Typically, these are physical quantities such as forces, moments, accelerations, nozzle areas, fluid flow rates, etc. This target vector is differenced with a vector $u_a$, containing the actual values for the same quantities. The differencing is accomplished at a fourth combiner 86. The output difference is an error vector $u_e$, which is then used to generate an L1 cost function at block 88. The output of block 88 is inputted to an L1 Solver at block 90, which accomplishes the remaining L1 Algorithm tasks. The output of block 90 is the vector u, containing commanded values for the control effectors. The control effector output vector u is provided as an input to the plant and as an input to a target gain matrix F. The output of the matrix F is combined with the bias vector $u_b$ at a combiner 94 to form the actual target vector $u_a$.

The target vector $u_c$ includes direct commands such as roll, pitch, and yaw, and also includes the nominal values of the fixed constraints, such as control ganging constraints, nominal trim settings for secondary controls (to be perturbed only when primary controls are saturated), and limits for any inequality constraints. In general, the actual targets in $u_a$ can be nonlinear functions of the controls in u. The relationship can be approximated by a linearized matrix-vector equation: $u_a = F\ u + u_b$, where u is the control vector and $u_b$ is the bias vector to hold the value of $u_a$ when u=0.

The L1 Optimizer is used to minimize the cost function based on the error vector $u_e$, where $u_e = u_a - u_c = F\ u + u_b - u_c$, and where u is the vector of unknown control signals. The cost function includes a set of penalty weights $W_{pi}$ and $W_{ni}$, as described in PART 4 below, to penalize the elements of $u_e$ for going positive or negative, respectively. The total cost function J is defined by this formula:

$$J = \sum_{i=1}^{r} W_{pi} \max(0, u_{ei}) + \sum_{i=1}^{r} W_{ni} \max(0, -u_{ei})$$

where $$u_e = Fu + u_b - u_c$$

The lower and upper bounds on each control $u_i$ are given by $u_{li}$ and $u_{ui}$. These are the deflection limits on each control. Slew rate limits can be handled directly by restricting the upper and lower bounds to the achievable range at each time frame, on an interval centered at the current control position.

Discussed below are various types of constraints in which an L1 optimizer output mixer formed in accordance with the present invention is capable of addressing. This list is not conclusive, but rather illustrative of the flexibility of the present invention.

The present invention output mixer can easily address equality constraints. For example, if the commanded target values for force and moment need to be satisfied exactly when possible, then they are handled as equality constraints by using equal penalty weights $W_p$ and $W_n$. for positive and negative values of $u_e$.

The present invention can address the relationships between primary and secondary controls. It is common for multi-variable control systems to designate certain control effectors as primary or secondary. The primary controls are used first to generate the desired control target values, and the secondary controls are used only if the primary controls are unable to meet the targets alone. For example, an airplane might preferentially use its outboard ailerons rather than its inboard ailerons to generate roll moment. An L1 output mixer can automatically redistribute control power to the secondary effectors when needed. The secondary effectors can simply be assigned to nominal, fixed values via $u_c$. The difference between actual and nominal values, normally zero, can be treated as a weak equality constraint by using small, equal values of penalty weights $W_p$ and $W_n$. The optimal L1 solution will respect this constraint when possible, but will violate it when necessary by using the secondary effectors to meet the higher-priority target values in $u_c$.

The present invention can address ganging or gearing of controls. Another known practice in control systems design is to "gear" sets of control effectors together through fixed mathematical relationships. A typical example is to move pairs of left and right control effectors in a symmetric or antisymmetric fashion. For example, the left and right ailerons might move by equal and opposite amounts. This can be enforced in an L1 output mixer using weak equality constraints. If the sum of left and right aileron deflections is constrained to zero, it produces antisymmetric motion. If their difference is constrained to zero, it produces symmetric motion. Using relatively weak penalty weights on these constraints allows the L1 mixer to violate these rules when necessary to match the higher-priority target commands.

The present invention can address inequality constraints. An L1 output mixer can enforce inequality constraints on the achieved target values in $u_a$ by setting $W_n$ to zero for upper bounds or $W_p$ to zero for lower bounds. In such cases, $u_c$ provides the value of the bound itself In the aerospace field, typical quantities that can be constrained in this way include total acceleration, total jerk (the rate of change of acceleration), structural load limits such as hinge moments or wing bending moments, electrical power consumption, hydraulic fluid flow rates, and many others. Many such constraints are linear (or nearly linear) functions of the controls. Some are nonlinear, such as electrical power, which is proportional to the square of motor voltage or current. However, smooth nonlinearities in elements of $u_a$ can be well approximated by linearization at the current control values.

The present invention can address nonlinear control targets. In general, a nonlinear control target function $u_a = f(u)$ can be linearized by the approximation $u_a = F\ u + u_b$. The output mixer makes one call to the L1 Optimizer for each such linearization. If necessary, multiple calls can be made, using the gradient matrix F and bias vector $u_b$ at each successive value of u to solve the nonlinear target function with high accuracy. Alternatively, the linearized problem solution can be used as the actual control in each time frame, with the result converging to the true nonlinear optimum over time.

The present invention can address slew rate limits. Limits on the values or rates of change of the controls u can be handled directly in discrete-time control systems, without the need for adding rows to the F matrix and new targets to $u_a$. The L1 Optimizer accepts upper and lower bounds on u directly. To accommodate slew rate limits, the upper and lower bound interval should simply be the intersection of the deflection limit interval and an interval centered about the current control values. For example, if the current aileron deflection is 2.0 degrees, and the maximum rate of change is 0.25 degree per time frame, then the upper and lower bounds should not exceed the interval from 1.75 to 2.25 degree during that time frame, even if the total deflection limits are ±30 degree.

The present invention can address failure reconfiguration. One very useful advantage of L1 output mixers over conventional mixers is the ability to accommodate known control effector failures immediately. If a control effector is known to have failed to a specific control value (such as zero), this can be handled directly by setting the upper and lower bounds to that value. Alternatively, the failed control's column of the F matrix can simply be removed, and a reduced-size problem solved. Because the number of possible failure combinations and failure modes in a large set of redundant control effectors is so large, conventional mixers can fail to account accurately for this important issue.

The present invention can address absolute value constraints. One type of nonlinear constraint requires special treatment. If a sum of absolute value terms needs to observe an equality or inequality constraint, a straightforward linear matrix representation of the problem cannot account for this directly, because the derivative of an absolute value term is discontinuous at zero. An example is a limit on nozzle area or total thrust for bidirectional thrusters: the thruster setting can be negative or positive (to represent left or right thrust, for example) but the magnitude of the thrust must be constrained. There is a relatively simple way to handle this in an L1 output mixer. Assume the need to use the absolute value of a variable x, either alone or in another equation. Then define a new unknown variable $x_a$ to be solved for in the u vector, to contain the absolute value of x. Define two inequality constraints, having strong $W_n$ penalty weights, to enforce these relationships: $x_a + x \geq 0$ and $x_a - x \geq 0$. Then the L1 Solver will force $x_a$ to equal the absolute value $|x|$ in order to eliminate these inequality penalties.

The present invention can address prioritization of target values. The individual target values in $u_c$ are given priorities through the setting of the $W_n$ and $W_p$ penalty weights on the error values $u_e = u_a - u_c$. Increasing the penalty weight on a given error value will increase its priority for matching its target value $u_a$ to its commanded value $u_c$. For inequality constraints, increasing the penalty weight causes the constraint to be treated more like a hard, inviolable constraint. An aerospace vehicle example might be to make the target pitch acceleration more important than the target yaw acceleration.

The formulation of optimization elements for use with an output mixer having an L1 Optimizer is as follows. For output mixing, the cost function J depends only on the target error vector $u_e$. The L1 Optimizer is used to solve for the control vector u. Therefore, it is necessary to determine the most efficient manner of mapping u into $u_e$. The definition of the cost function J for output mixing is:

$$J = \sum_{i=1}^{m} W_{pi} \max(0, u_{ei}) + \sum_{i=1}^{m} W_{ni} \max(0, -u_{ei})$$

| | |
|---|---|
| m | number of elements in $u_e$ |
| $u_{ei}$ | ith element of $u_e$ |
| $W_{pi}$ | penalty weight on positive $u_{ei}$ |
| $W_{ni}$ | penalty weight on negative $u_{ei}$ |

The $W_{pi}$ and $W_{ni}$ weights penalize the elements of the target error vector $u_e$ for being positive or negative. In most cases, prioritized equality constraints are desired, so the corresponding $W_{pi}$ and $W_{ni}$ elements will be equal in magnitude. An inequality penalty, such as an upper bound on some linear combination of u elements, would have $W_{pi}$ or $W_{ni}$ terms set to zero.

The basic form for describing the cost function J uses the composite vectors $W_{pt}$, $W_{nt}$, $e_t$, $x_t$, and $b_t$, and the matrix $A_t$, as follow:

$$J = \sum_{i=1}^{r} W_{pti} \max(0, e_{ti}) + \sum_{i=1}^{r} W_{nti} \max(0, -e_{ti})$$

where $$e_t = A_t x_t + b_t$$

The elements of the vectors $W_{pt}$, $W_{nt}$, and $e_t$ are given by $W_{pti}$, $W_{nti}$, and $e_{ti}$ respectively. The optimal solution vector $x_t$ is the output of the Algorithm. The vector $W_{pt}$, $W_{nt}$, $e_t$, $x_t$, and the matrix $A_t$ are defined in terms of the output mixer vectors and matrices as fallows:

$$W_{pt} = [W_p] \quad W_{nt} = [W_n] \quad e_1 = [u_e] \quad x_t = [u] \quad A_t = [F] \quad b_t = [u_b - u_c]$$

Using this description, the Dailey L1 Optimization Algorithm can solve for the optimal solution vector $x_t$, which here consists of simply the control vector u. The Algorithm takes $W_{pt}$, $W_{nt}$, $A_t$, and $b_t$ as inputs, together with upper and lower bounds on the $x_t$ elements, and returns the optimal solution vector $x_t$. The upper and lower bounds on $x_t$ are simply the control effector limits $u_u$ and $u_l$.

Figure 18:
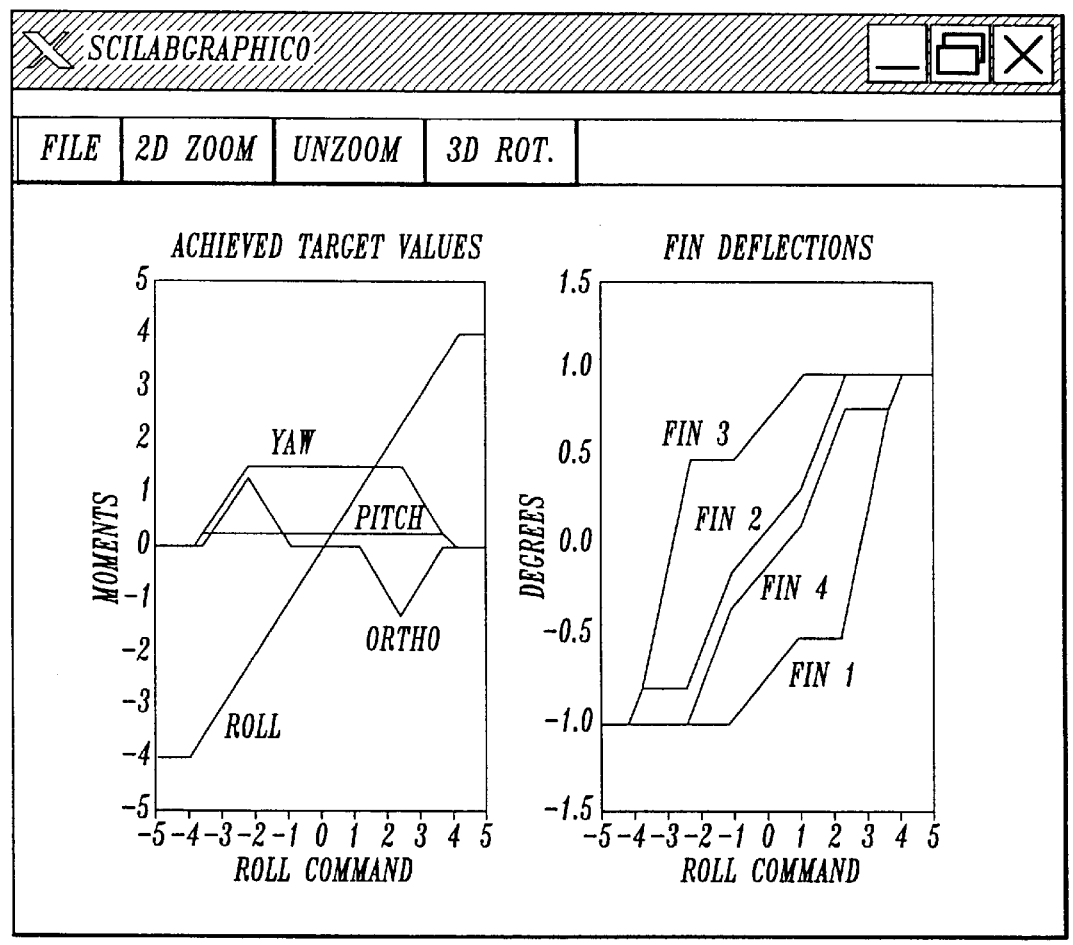
FIG. 18 illustrates moments and fin deflections using a control system formed in accordance with the present invention, particularly having the output mixing aspects described in FIG. 17.

FIG. 18 illustrates the results of implementing an L1 Optimizer for output mixing in the missile fin example of FIG. 15. Starting with the same F matrix used before to define roll, pitch, and yaw in terms of fin deflection, the first step is to add an additional row defining a constraint equation on the four fin deflections that is normally desired to be zero, and which corresponds to "wasted" fin motion producing no net change in pitch, roll, or yaw. Such constraint equations can be found easily by applying the singular value decomposition (SVD) to the F matrix, to identify the nullspace of the matrix. Since this target quantity is orthogonal to the motions producing roll, pitch, and yaw, the constraint signal is given the name "ortho." The motion corresponds to feathering adjacent pairs of fins toward each other so that their forces, except for drag, cancel out.

The new, expanded F matrix below adds a new "ortho" row to the F matrix used for the previous, conventional example. In the previous example, the matrix pseudo-inverse G causes this "ortho" quantity to be zero when the fins are unsaturated. In general, the ortho quantity corresponds to wasted control activity, for example, creating drag without any useful pitch, roll, or yaw. Therefore, it is desirable to constrain the ortho quantity to zero.

$$\begin{bmatrix} roll \\ yaw \\ pitch \\ ortho \end{bmatrix} = \begin{bmatrix} +1 & +1 & +1 & +1 \\ -1 & 0 & +1 & 0 \\ 0 & +1 & 0 & -1 \\ +1 & -1 & +1 & -1 \end{bmatrix} \begin{bmatrix} fin1 \\ fin2 \\ fin3 \\ fin4 \end{bmatrix} = F \begin{bmatrix} fin1 \\ fin2 \\ fin3 \\ fin4 \end{bmatrix}$$

The output mixer using the L1 Optimizer exploits this fourth constraint directly to determine and deliver the full range of achievable control power. When one or more fins is saturated, the L1 optimizer can still deliver the commanded moments by allowing the ortho constraint term to become nonzero. Accordingly, the ortho output error is given smaller $W_p$ and $W_n$ penalty weights than the roll, pitch, and yaw error terms, so that the optimal solution will make ortho nonzero before it allows roll, pitch, or yaw error to become nonzero.

FIG. 18 illustrates the results of sweeping through a range of roll commands with this L1 optimal constrained output mixer, using the 4-by-4 matrix F given above, with clipping limits of ±1 on each fin. For this example, the $W_p$ and $W_n$ penalty weights for roll were set to 10.0, the weights for yaw and pitch were set to 1.0, and the weights for ortho were set to 0.1. Other conditions are identical to the previous conventional example. The yaw command is fixed at +1.5 and the pitch command is fixed at +0.2, while the roll command sweeps from −5 to +5.

As with the conventional mixer, for roll commands in a neighborhood centered at zero, the mixer delivers the requested roll, pitch, and yaw moments simultaneously. The conventional mixer failed to deliver the requested moments for roll command magnitudes above 1.0, when one or more of the fins became saturated. However, for this L1 output mixer, all three commanded moments are produced exactly, with no error, for roll command magnitudes up to 2.3. Thus, the linear control power envelope has been more than doubled, compared to the conventional mixer, for this set of inputs. For this example, it is impossible to deliver all three commanded moments beyond this point with the given fin deflection limits. However, even when the input commands are impossible, the L1-optimized output mixing provides useful results by prioritizing the constraints through its penalty weights.

In the range of roll moment magnitudes from 2.3 to 3.6, the mixer continues to deliver exactly the requested roll and pitch moments, but the achieved yaw moment drops steadily. From 3.6 to 4.0, the pitch moment also drops to zero. Beyond 4.0, the mixer delivers a pure roll moment of 4.0, the maximum possible, with zero values for yaw, pitch, and ortho. This prioritization behavior occurs because roll error was given a higher penalty weight than the other constraints. Similarly, ortho is the first constraint to be sacrificed, because its penalty weight is lower than the others.

Figure 19:
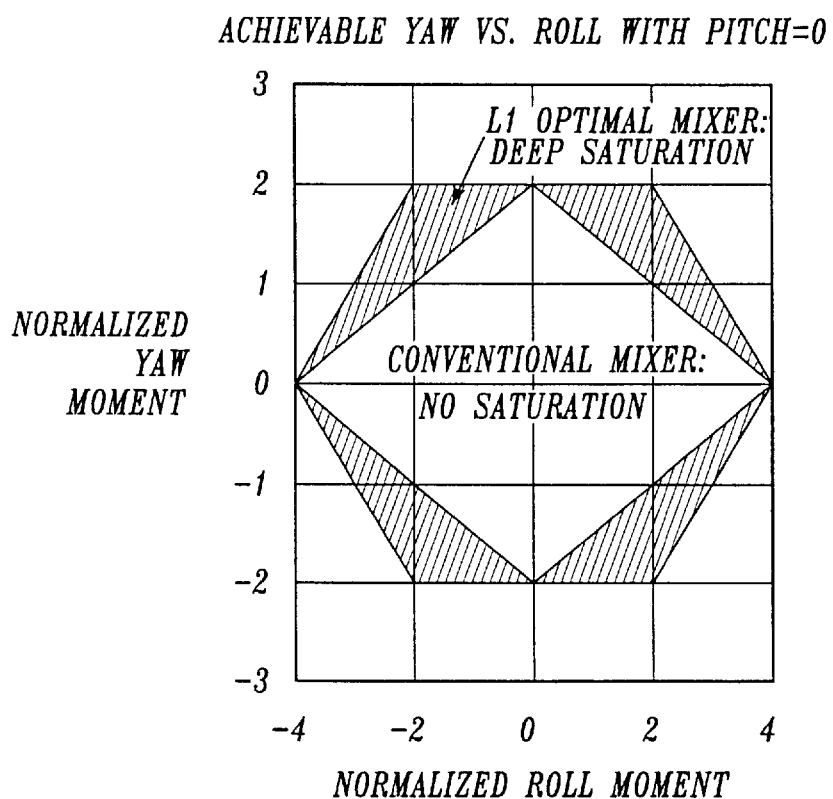
FIG. 19 is a graph comparing achievable zero-error roll and yaw moment for the fin example between a conventional output fin mixer an output mixer formed in accordance with the present invention.

FIG. 19 illustrates the functional difference between the use of a conventional output mixer verses the output mixer of the present invention. In particular, FIG. 19 illustrates the range of achievable zero-error roll and yaw moment that an optimal control system using an L1 Optimizer for output mixing and a conventional output mixer can produce, for a pitch moment value fixed at zero. "Zero-error" means that within this envelope, the roll, pitch, and yaw command targets are all met exactly by the mixers. Because the conventional mixer introduces command matching errors as soon as any fin becomes saturated, its envelope is a four-sided diamond shape corresponding to the four fins reaching their saturation limits. The L1 optimal mixer encloses a significantly larger region, because it can tolerate up to two saturated fins before it must give up on matching pitch, yaw, or roll exactly. The additional region covered by the L1 output mixer is shaded in the diagram.

These zero-error control power envelopes correspond to the range of moments that a linear control system could command before encountering stability or cross-axis coupling problems, caused by unsatisfied moment commands or uncommanded cross-axis moments.

The present invention output mixer is useful in a wide range of control system applications. The mixer can be used in a controller to distribute a set of total control power commands, such as total forces or moments, among a larger, redundant set of control effectors, while enforcing the position and rate limits of each control effector, and while imposing additional equality and inequality constraints on the control effector commands. The technique allows the plant's full range of achievable control power to be exploited by the controller. Priorities can be placed automatically upon the use of different control effectors, so that some become "primary" controls to be used first, with the other "secondary" controls to be used when the primary controls have saturated. Also, priorities can be placed upon the achievement of the total control power commands. For example, an output mixer for producing roll, yaw, and pitch moment could be prioritized to trade off yaw in favor of roll, or vice versa. Such prioritizations of control effectors and control power commands are similar to the prioritization of regulator channels described in PART 1, and are achieved using the L1 cost function weights.

Examples of control effectors include aircraft or missile control surfaces, thruster nozzle areas, hydraulic servo valves, electric motors and servos, engine controls, and others. Nearly all practical control effectors have upper and lower bounds, such as bounds on control surface deflection angle, and also have slewing rate limits. One example of additional equality constraints that the L1 output mixer can handle is an area matching constraint, in which the sum of several thruster nozzle areas must be held constant. An example of an inequality constraint in a hydraulic system, would be keeping the sum of all servo valve flow rates below a set maximum.

In conventional linear programming (LP), all inequality and equality constraints are generally hard and inviolable. That limitation has made LP difficult to apply successfully to control problems in the past, since there was no way to prioritize the constraints, and since many problems had no feasible solutions. One of many ways that the Dailey L1 Optimization Algorithm differs from LP is that the L1 Algorithm handles constraints as penalties rather than as hard constraints.

PART 3

This section describes a general feedback control system to fully exploit control power limits using a single L1 Optimizer to perform the output mixing of PART 2 and the anti-windup and automatic command limiting features of PART 1. This overall general optimal control system addresses antiwindup, automatic command limiting, channel prioritization, output mixing, control effector prioritization, control and state limit constraints, and gain-scheduled linear controls.

PART 1 described how to use L1 optimization to solve for injection errors at the input of a control system, in order to provide prioritized command channel limiting and to prevent cross-channel coupling when the controls saturate. The control system of PART 1 also prevents integrator windup during control saturation, although that feature does not depend directly upon L1 optimization. The controller structure was explained first for single-channel systems and then for multiple channels. The technique in PART 1 was restricted to "square" systems, having equal numbers of controls and regulator command channels, because it required a matrix inverse.

PART 2 described how to create output mixers for "non-square" systems, having more controls than commands, by using the Dailey L1 Optimization Algorithm to distribute the commands to the control effectors. The technique in PART 2 handles control saturation, control effector prioritization, failure reconfiguration, and additional equality constraints and inequality constraints on the controls. PART 2 treated the output mixer as a self-contained system acting upon the outputs of a separate control system. It did not address automatic command limiting at the inputs, as in PART 1.

PART 3 will now describe how to combine the output mixer of PART 2 with the antiwindup command-limiting structure of PART 1. The result is a general-purpose arrangement for non-square multi-channel control systems, having more control effectors than regulator command channels. A single, combined optimization problem provides all the benefits claimed in PARTS 1 and 2 simultaneously. A significant advantage in combining them is that the automatic command limiter can then use the full range of available control power from all control effectors, instead of limiting the input commands at the point where the first control effector saturates, as with a conventional output mixer. This provides significantly higher command tracking performance, as the example will show.

Figure 20:
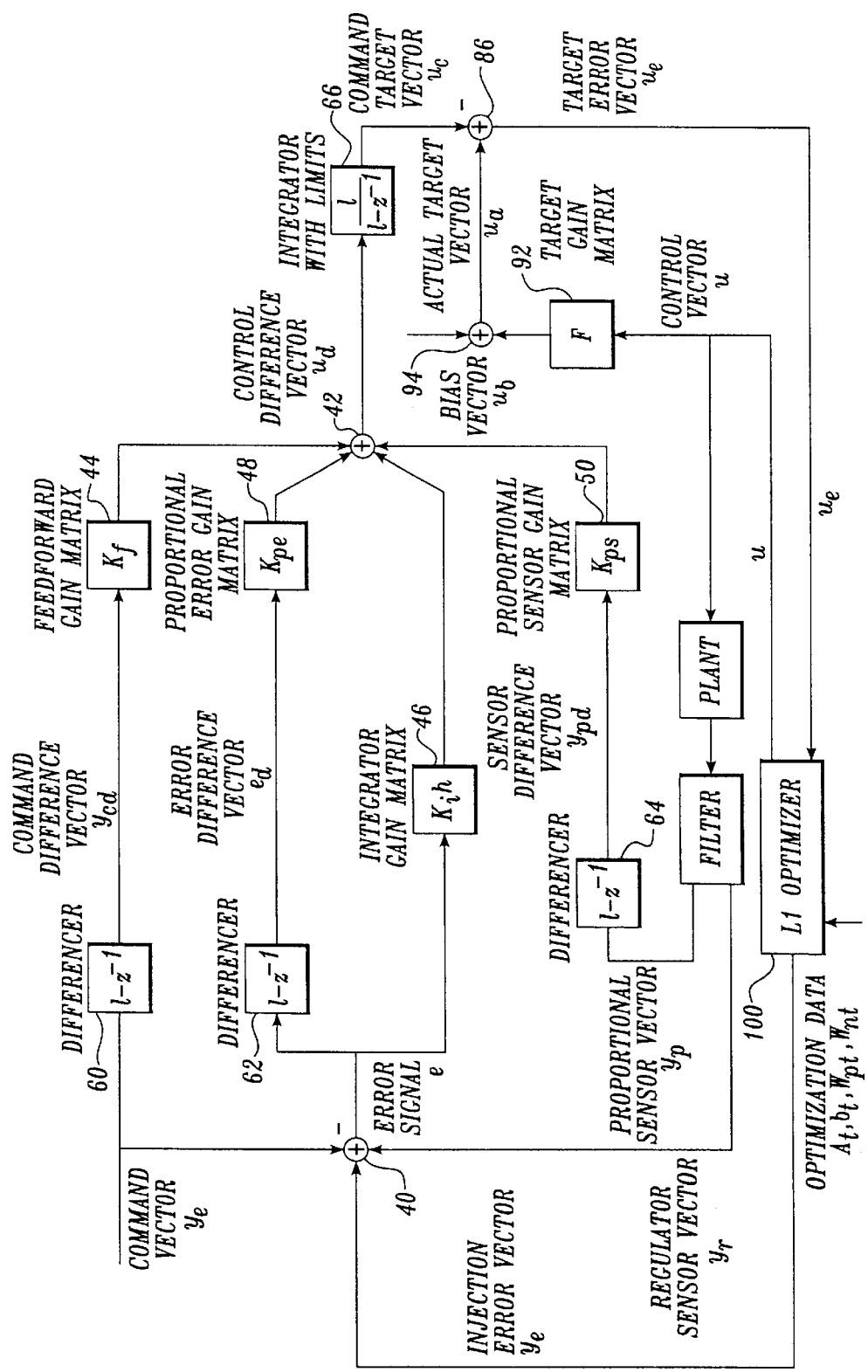
FIG. 20 is a control flow diagram of a general purpose optimal control system formed in accordance with the present invention.

FIG. 20 is a diagram of the general-purpose optimal control system formed in accordance with the present invention. It combines the elements described above in the square system controller of PART 1 and the output mixer of PART 2. The diagram in FIG. 20 is similar to FIG. 12, which shows the optimal control system for "square" systems. The difference in FIG. 20 is that the control vector u is no longer taken from the output of a mixer gain matrix G. Instead, it is directly solved for by the L1 Optimizer at block 100, in a manner as described in the output mixer of PART 2. A target gain matrix F and control bias vector $u_b$ define the relationship $u_a = Fu + u_b$ between u and the achieved control target quantities in vector $u_a$, which will usually be forces, moments, accelerations, and related quantities. The pseudo-control output command from the linear control system is the vector $u_c$. The target error vector $u_e = u_a - u_c$, and a set of penalty weights, are used to define part of the cost function for the L1 Optimizer, as in the output mixer of PART 2.

The remainder of the L1 cost function is built up by penalizing the magnitude of the injection error vector $y_e$, as in PART 1. The objective is to make $y_e$ as small as possible subject to the requirement that $u_e = 0$, at least for those elements of $u_e$ that represent unsatisfied control power commands. This is handled by placing relatively large penalty weights on such elements of $u_e$. In this way, the output signal is always required to respect the true physical limits of the plant. At the same time, the output mixer ensures that all of the control effectors in u are used within their limits to deliver the commanded target $u_c$ (force, acceleration, moment, etc.) as long as it is possible to do so. When it is not possible to meet the target $u_c$, the L1 Optimizer will adjust the injection error $y_e$ until $u_c$ is reduced to an achievable value. The penalty weights on $y_e$ can be prioritized to favor errors in some regulator channels over others, as with the "square" controller of PART 1.

As will be appreciated from a reading of the above, the present invention provides a remarkable set of capabilities in a single control system. By performing the optimal output mixer function simultaneously with the command error injection function, this general-purpose L1 controller can not only prevent integrator windup and cross-channel coupling as in PART 1, but can also operate freely through the full envelope of available control power, even in non-square systems having many more control effectors than regulator channels. The output mixer capabilities described in PART 2 still apply, including failure reconfiguration, equality and inequality constraints, assignment of secondary controls, control ganging or gearing, control effector position and rate limits, and absolute value constraints. Finally, the injection errors in $y_e$ can be prioritized for tighter regulation of some channels than others, with injection errors appearing only when it is physically impossible to meet the targets using all the available controls.

The vector signal relationships in FIG. 20 are summarized as:

$e = y_r - y_c + y_e$
$u_d = K_i h\ e + K_{pe} e_d + K_{ps} y_{pd} + K_f y_{cd}$
$e_d(n+1) = e(n+1) - e(n)$
$y_{pd}(n+1) = y_p(n+1) - y_p(n)$
$y_{cd}(n+1) = y_c(n+1) - y_c(n)$
$u_c(n+1) = u_c(n) + u_d(n+1)$
$u_e = u_a - u_c = Fu + u_b - u_c$

The L1 Optimizer at block 100 is presented with its problem data in a form consisting of the total problem matrix $A_t$, total target vector $b_t$, positive and negative penalty weights $W_{pt}$ and $W_{nt}$, and the upper and lower bounds on the unknowns to be solved for. The formulation of these matrices and vectors in terms of the quantities in FIG. 20 are given later in PART 3.

To demonstrate the effectiveness of the arrangement in FIG. 20, the present invention general purpose optimal control system is now applied to the two-armed manipulator linkage example described in PART 1. In PART 1, the two-armed manipulator example was presented using only the two "shoulder" motors, $T_1$ and $T_2$. All four control motors may be used now, by adding the "elbow" motor torque controls $T_3$ and $T_4$ to the problem. The linear control system used in PART 1 is used again here (refer to PART 1 for the derivation and values of the gain matrices $K_{pe}$, $K_i$, $K_f$, and $K_{ps}$.) The output of these linear gain matrices is a pseudo-control target vector $u_c$ consisting of desired x and y axis accelerations. In PART 1, a square mixer matrix G was used to map these targets into the motor torques $T_1$ and $T_2$, by applying the inverse of the corresponding columns of the target plant gain matrix F. The requirement for a matrix inverse restricted the method to square systems.

In PART 3, the entire 2-row, 4-column F matrix can be used. The L1 output mixer function calculates the optimal values of $T_1$, $T_2$, $T_3$, and $T_4$ to deliver the requested accelerations. In addition, x and y command injection errors can be solved for, as in the PART 1 example, to ensure that the linear control system does not drive the target command vector $u_c$ beyond what is physically achievable.

Weak penalty weights, with values of 0.01, are placed on the controls $T_3$ and $T_4$. This causes them to be treated as "secondary" controls during output mixing, to be used only when the $T_1$ and $T_2$ "primary" controls are unable to deliver the commanded acceleration. Stronger penalty weights, with values of 0.1 and 0.3 respectively, are placed on the x and y position command injection errors in $y_e$. A stronger penalty is placed on y error than on x error, so that the system will tend to inject x error before y error when the nominal linear control system demands unachievable acceleration levels. The strongest penalty weights, with values of 100.0, are placed on the elements of the target command error vector $u_e$, so that the L1 Optimizer will treat these as hard constraints, using command injection errors in $y_e$ to ensure that the control system never requests unachievable acceleration levels. The outputs of the L1 Optimizer are the x and y injection errors in $y_e$, and the four control torques $T_1$, $T_2$, $T_3$, and $T_4$. All four torques are limited to the range ±0.16 N-m, as $T_1$ and $T_2$ were in PART 1.

Figure 21:
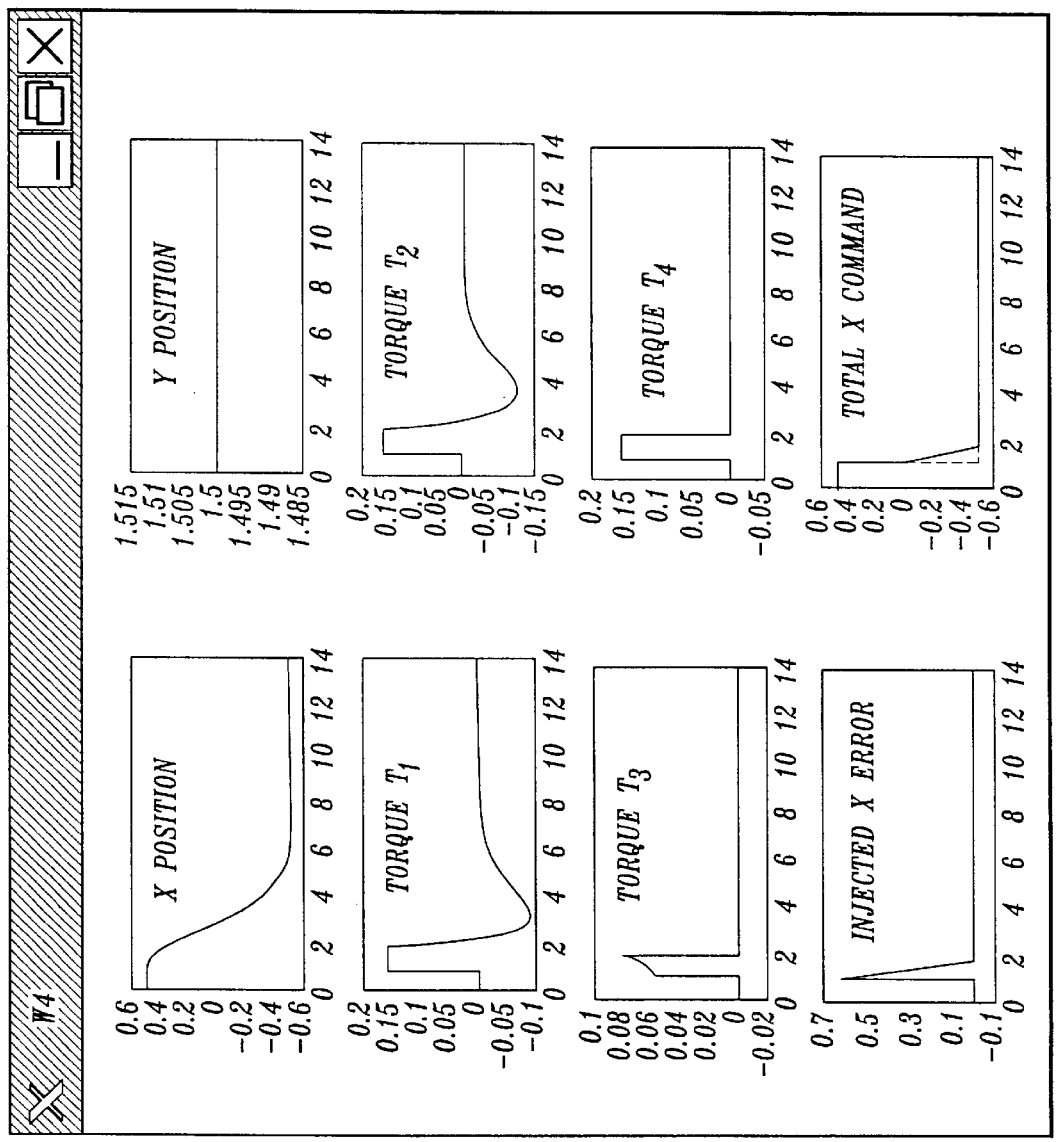
FIG. 21 illustrates the response of a non-square general purpose optimal control system that combines the present invention command limiting, antiwindup, and output mixing features.

FIG. 21 plots the time histories of several variables for this control system. The initial conditions, limits, and step command are identical to those used in the example in PART 1. A large x position step command is introduced at t=1 sec, while the y position command remains steady. As before, the linear feedback and feedforward gains produce a command that saturates the control effectors. Also as before, the linkage x position moves rapidly to its target, with zero overshoot, while the y position remains steady at its initial position with no cross-channel coupling effects.

In this example, the $T_3$ and $T_4$ motor torque commands at the linkage "elbows" are available; the PART 1 example used only the $T_{1\ and\ T2}$ torques for the linkage "shoulders." Nevertheless, the step command is still large enough that even all the control power available cannot satisfy the linear control system's nominal x acceleration command, even using four motors. Therefore, the x error injection signal, calculated by the L1 Optimizer, provides a brief 1-second triangular pulse, so that the total command (external step plus injection error) ramps down gradually over that 1-second period to its final value. Comparing this to the PART 1 example shows, however, that the injection error now disappears in only 1 second, rather than 2 seconds as before. The additional control power from $T_3$ and $T_4$ allow the system to return to normal linear operation more quickly.

Examining the motor torques shows why this is so. At the initial step, control torques $T_1$, $T_2$, and $T_4$ saturate to their limits, while $T_3$ is unsaturated and follows a curved path. This combination of torques provides the maximum possible x-axis acceleration under the constraint that y-axis acceleration remain zero. After one second, both $T_3$ and $T_4$ ramp quickly down to zero and remain at zero for the rest of the time history. That occurs because the output mixing penalty weights discourage the use of these controls: $T_3$ and $T_4$ are penalized in the cost function while $T_1$ and $T_2$ are not. Thus, $T_3$ and $T_4$ are treated as "secondary" controls, and are used only when necessary to deliver the x or y acceleration targets.

Because the penalty weights on $T_3$ and $T_4$ are weaker than the penalty weights on x and y command injection error, the L1 Optimizer will allow $T_3$ and $T_4$ to be used when they will reduce the size of the injection error. In other words, tracking the x and y position commands as closely as possible is more important than avoiding the use of the secondary controls. This prioritization establishes the requirement that the controller should use all the available control power to track its commands, even when some controls are in deep saturation. This behavior is an important advantage when combining the output mixer of PART 2 with the command-limiting controller of PART 1.

The strongest penalty weights are those on the acceleration errors between the linear control system's request and the actual acceleration achieved by the output mixer. By making these weights strong, these errors are treated as absolute constraints that are always satisfied. Whenever the nominal linear control system would have demanded an unachievable acceleration, the injection error signals will limit the commands so that the acceleration demand is reduced to an achievable level.

Comparing FIG. 21 against FIG. 13 for the "square" L1 controller example, the total time to acquire the step command target has been reduced by about 1 second. The time spent in control saturation was reduced from 2 seconds to 1 second, which accounts for the difference.

The formulation of L1 optimization elements for use with the present invention general purpose control system is as follows. The cost function J for the L1 Algorithm is formulated below for the general-purpose L1 controller. In PART 1, the "square" controller's cost function J penalized the injection error vector $y_e$, and also applied strong constraint penalties to force the control vector u to respect its upper and lower bounds $u_u$ and $u_l$. Now that output mixing is part of the controller, it is no longer necessary to use penalty weights to enforce these bounds on u. Instead, the control u is solved for directly by the L1 Optimizer, and it applies the bounds directly. The L1 Optimizer also solves for the command injection error vector $y_e$, as in PART 1.

However, it is now necessary to put penalty weights on the controller target error vector $u_e = u_a - u_c = Fu + u_b - u_c$, so that the target vector $u_c$ always remains physically achievable. Therefore, the matrices that map $y_e$ and u into $u_e$ must be included in the $A_t$ and $b_t$ problem matrix data presented to the L1 Optimizer.

At each time step, the controller calculates the optimal values of $y_e$ and u to minimize J, which is a function of $y_e$ and $u_e$, where $u_e$ includes the full set of desired output mixer constraints, such as the "ortho" signal in the example of PART 2. Because $u_e$ depends upon $y_e$ through the $K_{pe}$ and $K_i$ gain matrices, this technique automatically accounts for the control system gains, even in gain-scheduled linear control systems where the gain matrices change continually.

The symbols in the formula for the cost function J are defined below.

| | |
|---|---|
| r | number of elements in $y_e$ |
| m | number of elements in $u_e$ |
| $y_{ei}$ | ith element of $y_e$ |
| $u_i$ | ith element of u |
| $u_{di}$ | ith element of $u_d$ |
| $u_{ui}$ | upper bound of control signal $u_i$ |
| $u_{li}$ | lower bound of control signal $u_i$ |
| $W_{ei}$ | penalty weight on $y_{ei}$ |
| $W_{pi}$ | penalty weight on positive $u_{ei}$ |
| $W_{ni}$ | penalty weight on negative $u_{ei}$ |

The cost function J is defined as:

$$J = \sum_{i=1}^{r} W_{ei}|y_{ei}| + \sum_{i=1}^{m} W_{pi}\max(0, u_{ei}) + \sum_{i=1}^{m} W_{ni}\max(0, -u_{ei})$$

As in PART 1, the first term penalizes the absolute values of the injection error vector elements. By assigning the $W_{ei}$ penalty weights, relative priorities are placed upon each regulator channel.

The second and third terms no longer enforce the upper and lower bounds of u, as they did in PART 1. Now they correspond to the penalty terms in the L1 output mixer of PART 2. The second term penalizes the elements of the mixer's target error vector $u_e$ when they are positive, and the third term penalizes them when they are negative. These penalties should be large for those elements of $u_e$ that represent control power errors (e.g., acceleration errors, force errors, etc.) However, other elements of $u_e$ may represent "soft" constraints on secondary controls, or ganging constraints like the "ortho" signal in the PART 2 example. For these terms, the penalty weights should be smaller, so that the output mixer can override them when necessary to deliver the needed control power.

When the output mixer is able to deliver the linear control system's nominal control power request, the optimal solution will set $y_e = 0$, and the nominal linear control system response remains in effect. Note that, unlike the PART 1 "square" controller, this general-purpose controller can enforce the nominal linear control system gains even when some controls are saturated. As long as some combination of controls in u is able to deliver the control power, the injection error $y_e$ will be zero and the linear control system behavior is preserved.

The control difference vector $u_d$ and the command target vector $u_c$ depend upon the injection error vector $y_e$ and the control vector u through the relationships below. The vector $e_{old}$ refers to the value of e from the previous time step. The vector $u_{c,old}$ is the value of $u_c$ from the previous time step.

$u_d = K_i h e + K_{pe} e_d + K_{ps} y_{pd} + K_f y_{cd}$ $e = y_r - y_c + y_e$ $e_d = e - e_{old}$ $u_d = (K_i h + K_{pe}) y_e + (K_i h + K_{pe})(y_r - y_c) - K_{pe} e_{old} + K_{ps} y_{pd} + K_f y_{cd}$ $u_c = u_{c,old} + u_d$ $u_e = Fu + u_b - u_c$ Using the above matrix formula for $u_e$, the cost function J can be represented in the basic matrix form used by the Dailey L1 Optimization Algorithm. The basic form is given by:

$$J = \sum_{i=1}^{r} W_{pti} \max(0, e_{ti}) + \sum_{i=1}^{r} W_{nti} \max(0, -e_{ti})$$

where $e_t = A_t x_t + b_t$

Here the elements of the vectors $W_{pt}$, $W_{nt}$, and $e_t$ are given by $W_{pti}$, $W_{nti}$, and $e_{ti}$ respectively. The optimal solution vector $x_t$ is the output of the L1 Algorithm. The vectors $W_{pt}$, $W_{nt}$, $e_t$, $x_t$, and $b_t$, and the matrix $A_t$ are defined in terms of the control system vectors and matrices as follows:

$$W_{pt} = \begin{bmatrix} W_e \\ W_p \end{bmatrix} \quad W_{nt} = \begin{bmatrix} W_e \\ W_n \end{bmatrix} \quad e_t = \begin{bmatrix} y_e \\ u_e \end{bmatrix} \quad x_t = \begin{bmatrix} y_e \\ u \end{bmatrix} \quad A_t = \begin{bmatrix} I & 0 \\ K_i h + K_{pe} & F \end{bmatrix}$$

$$b_t = \begin{bmatrix} 0 \\ u_b - u_{cold} - (K_i h + K_{pe})(y_r - y_c) + K_{pe} e_{old} - K_{ps} y_{pd} - K_f y_{cd} \end{bmatrix}$$

Using the above matrix description, the L1 Algorithm can solve for the optimal solution vector $x_t$, which includes $y_e$ and u as elements. The Algorithm takes $W_{pt}$, $W_{nt}$, $A_t$, and $b_t$ as inputs, together with upper and lower bounds on the $x_t$ elements, and returns the optimal solution vector $x_t$. The upper and lower bounds on u are simply the control effector limits $u_u$ and $u_l$, as with the output mixer of PART 2. The upper and lower bounds on $y_e$ should be set to large values so that they do not affect the solution.

As will be appreciated from a reading of the above, the present invention provides an optimal control system having tremendous advantages. Because the present invention controller can include conventional linear control system gain equations as constraints, it is compatible with most current-day control system design practices. In this sense, it can be viewed as a higher-level "wrapper" that encloses a conventional control system, and that automatically solves and prevents a wide variety of problems that have long plagued control system designers. In addition, should circumstances warrant, it is possible for a designer to select only those aspects presented herein that are directly useful for his or her particular application.

As the examples have shown, the L1 Optimizer allows the control system to make maximum use of all the available control effectors, and to "ride the limits" of the control power envelope to deliver the maximum possible performance. By fully exploiting all the controls while enforcing general constraints, product weight, cost, and power consumption can be reduced by eliminating control hardware and/or reducing control effector performance requirements. Alternatively, aspects of the present invention can boost the performance of existing systems without adding any new control hardware.

PART 4

The Dailey L1 Optimization Algorithm is new and is capable of solving piecewise-linear convex optimization problems. When implemented in an electronic device or other type of computer system, the Algorithm is referred to as an L1 Optimizer.

The Algorithm (or Optimizer, as implemented) accepts input data in a basic matrix form consisting of the matrices and vectors A, b, $W_p$, $W_n$, $x_u$, and $x_l$, listed below. The subscript i after any vector name denotes the with element of that vector.

| | |
|---|---|
| n | number of columns in A |
| m | number of rows in A |
| A | initial problem description matrix |
| b | vector of initial values for e (when x = 0) |
| x | vector of unknowns |
| e | error vector |
| J | the L1 cost function |
| $x_u$ | vector of upper bounds for x |
| $x_l$ | vector of lower bounds for x |
| y | dual vector to x, for handling upper bounds |
| $W_p$ | penalty weight for positive e elements |
| $W_n$ | penalty weight for negative e elements |
| C | problem description tableau matrix |
| f | first column of C |
| G | remaining columns of C |
| g | a candidate pivot column of G |
| t | scalar parameter for one-dimensional searches |
| $v_r$ | vector of row variables |
| $v_c$ | vector of column variables |
| $k_r$ | index vector for column variables in $v_r$ |
| $k_c$ | index vector for column variables in $v_c$ |
| $\Delta J_W$ | weighted cost reduction score |

The cost function J is given by:

$$J = \sum_{i=1}^{m} W_{pi} \max(0, e_i) + \sum_{i=1}^{m} W_{ni} \max(0, -e_i)$$

$$e = Ax + b$$

$$x_{li} \leq x_i \leq x_{ui}$$

In general, the Dailey L1 Optimization Algorithm assembles the input data (also referred to as "problem" data) into a single tableau matrix C. The value of the cost function J is calculated using the tableau matrix C. Row and column pivoting operations are applied to the tableau matrix C until the cost function J converges to an optimal cost function value. The paragraphs below first provide a description of the formation of the tableaux matrix C, the calculation of the cost function J, and the transformation provided by the pivoting step. Next, is a description of how the row and column pivot locations are selected. This is followed by a description made with reference to the flow chart of FIG. 22.

Formation of the Tableau Matrix C

The formation of the tableau matrix C is accomplished by initially loading vector b and matrix A into a single matrix, with vector b in column 1 and matrix A in columns 2 through n+1:

C=[b A]=f=[f G]

Vector f and matrix G refer to the first column of tableau matrix C and the remaining columns of C, respectively. Initially, vector f=vector b and matrix G=matrix A. As the Algorithm proceeds, the contents of tableau matrix C are transformed at each step.

The tableau matrix C represents a mapping from the vector of column variables $v_c$ into the vector of row variables $v_r$, as follows:

$v_r$=f+G $v_c$

Initially, the error vector e is used as the row variable vector $v_r$, and the vector of unknowns x is used as the column variable vector $v_c$. Thus, the relationship between them is initially given by:

e=$v_r$=f+G $v_c$=b+Ax

The Dailey L1 Optimization Algorithm selects pairs of variables, one from $v_r$ and one from $v_c$, to be exchanged via a matrix pivoting operation. The two variables used are a row pivot (one element of $v_r$) and a column pivot (one element of $v_c$). This pivoting step is equivalent to algebraically exchanging these two variables between the left-hand and right-hand sides of the equation $v_r=f+G\ v_c$. Thus, over time, both $v_r$ and $v_c$ will contain variables from both e and x, with the unknown x variables tending to migrate from $v_c$ to $v_r$. The algebraic pivoting operation transforms all the elements of C at each step, and involves the same formulas used in standard Gauss-Jordan elimination. However, the method used herein to choose which two variables to exchange is unique to the Dailey L1 Optimization Algorithm.

Calculation of Cost Function J

The value of J is determined by assuming that $v_c=0$; i.e. all the column variables are zero. With that assumption, $v_r=f$, so the values of the row variables can simply be read directly from the first column of C. Recall that $v_r$ contains both x and e variables, and that x variables do not contribute directly to the cost function J. Therefore J can be calculated from C by stepping through each element of $v_r=f$. If an element is an x variable, ignore it. If an element is an e variable, apply its $W_p$ weight if positive or its $W_n$ weight if negative. Accumulate the total to find J.

As the elements of $v_r$ and $v_c$ are repeatedly exchanged, their identities as elements of the original e and x vectors must be preserved. This is handled by maintaining two index vectors of integers, one vector each for vector $v_r$ and vector $v_c$, and by assigning a unique index number to each element of e and x. As each pivoting step is performed, the two corresponding index vector elements are exchanged. This allows each element of vector $v_r$ and vector $v_c$ to be traced back to its original element of e or x. This is important for calculating the cost function J, in which the $W_p$ and $W_n$ weights must be known for each e variable. It is also important for finding the upper and lower bounds for each x variable.

The Pivoting Step

The choice of row and column pivots is made to reduce the cost function J at each step. The formulas used to perform the pivoting step are given below. To simplify the derivation and explanation, assume without loss of generality, that the last row and column have been chosen as pivots in an example tableau matrix C. Since $v_r=f+G\ v_c$, the vectors and matrices may be defined as follows:

$$G = \begin{bmatrix} G_{11} & g_{12} \\ g_{21} & g_{22} \end{bmatrix} \quad f = \begin{bmatrix} f_1 \\ f_2 \end{bmatrix} \quad v_r = \begin{bmatrix} v_{r1} \\ v_{r2} \end{bmatrix} \quad v_c = \begin{bmatrix} v_{c1} \\ v_{c2} \end{bmatrix}$$

where element $g_{22}$ is the pivot element and is assumed to be nonzero. Further, $g_{22}$, $f_2$, $v_{r2}$, and $v_{c2}$ are scalars. The submatrix $g_{21}$ is a row vector, while $g_{12}$, $f_1$, $v_{r1}$, and $v_{c1}$ are column vectors and $G_{11}$ is a full matrix.

The relation between $v_r$ and $v_c$ can be written as a system of equations:

$v_{r1} = f_1 + G_{11} v_{c1} + g_{12} v_{c2}$ $v_{r2} = f_2 + g_{21} v_{c1} + g_{22} v_{c2}$

Using standard linear algebra, scalar $v_{c2}$ can be isolated onto the left-hand side of the second equation. Substituting that expression into the first equation yields a reordered system of equations having $v_{r1}$ and $v_{c2}$ on the left-hand side:

$$v_{r1} = \left(f_1 - \frac{g_{12}f_2}{g_{22}}\right) + \left(G_{11} - \frac{g_{12}g_{21}}{g_{22}}\right)v_{c1} + \left(\frac{g_{12}}{g_{22}}\right)v_{r2}$$

$$v_{c2} = \left(-\frac{f_2}{g_{22}}\right) + \left(-\frac{g_{21}}{g_{22}}\right)v_{c1} + \left(\frac{1}{g_{22}}\right)v_{r2}$$

Rewriting the transformed tableau matrix C contents (denoted by hats) using these formulas produces:

$$\begin{bmatrix} \hat{f}_1 & \hat{G}_{11} & \hat{g}_{12} \\ \hat{f}_2 & \hat{g}_{21} & \hat{g}_{22} \end{bmatrix} = \begin{bmatrix} f_1 - \dfrac{g_{12}f_2}{g_{22}} & G_{11} - \dfrac{g_{12}g_{21}}{g_{22}} & \dfrac{g_{12}}{g_{22}} \\ -\dfrac{f_2}{g_{22}} & -\dfrac{g_{21}}{g_{22}} & -\dfrac{1}{g_{22}} \end{bmatrix}$$

This algebraic transformation is not new, but is described here to make clear the relationship between the row and column vectors $v_r$ and $v_c$ and the tableau matrix C. After each pivoting step, one pair of variables will have been swapped between $v_r$ and $v_c$. Since the evaluation of the cost function J always assumes that $v_c=0$ so that $v_r=f$, the choice of which two variables to swap must be made to reduce J at each step. The method used to choose these two variables (the row and column pivots) is unique to the Dailey L1 Optimization Algorithm and is described below.

Selection of Row and Column Pivots

Prior to describing the selection, a description of how upper and lower bounds on x are treated and a description of the convex nature of cost function J are provided.

Recall that in the problem formulation, each element $x_i$ of the vector of unknowns x has a lower and upper bound:

$x_{li} \leq x_i \leq x_{ui}$

The Algorithm simplifies the handling of these bounds by subtracting the lower bound $x_{li}$ from each element of x and its corresponding upper bound $x_{ui}$, in a simple change of variables. The same notation $x_i$ to denote these transformed variables is used in the explanation that follows. As described below, the lower bounds are added back to the optimal solution before reporting the results. Therefore, the Algorithm assumes the lower bound is zero, where the new upper bounds $x_{ui}$ are given by the original $x_{ui}-x_{li}$.

$0 \leq x_i \leq x_{ui}$

As the Algorithm proceeds, some of the x variables may need to go to their upper bounds in order to minimize the cost function J. Recall that all variables in the column vector $v_c$ are assumed to be zero. It is also necessary to represent an x variable at its upper bound by the quantity zero, so that it can be represented in the column vector $v_c$. This can be done easily by defining a new set of variables $y_i=x_{ui}-x_i$, in which each x variable is subtracted from its upper bound. Where $x_i$ hits is upper bound, $y_i$ goes to zero, and vice versa, The same upper bounds (and lower bound of zero) apply to both x and y:

$0 \leq y_i = x_{ui} - x_i \leq x_{ui}$

At each pivoting step, the Algorithm automatically converts any x variable that has hit its upper bound into its y counterpart, and vice versa. In this way, x and y variables are never set to their upper bounds; their counterparts are set to zero instead, which allows them to be stored in the column vector $v_c$. The Algorithm keeps track of this by modifying the unique index numbers already used to keep track of the location of x and e variables in the row and column vectors $v_r$ and $v_c$. Each $y_i$ variable and its $x_i$ counterpart receive unique index numbers.

The pivot selection method used by the Dailey L1 Optimization Algorithm relies on the cost function J being a convex function of x. By being a convex function, the cost function will have only one local minimum, which is identical to its global minimum. Thus, there is no possibility of converging to a false (non-global) minimum. In addition, because the cost function is convex, its derivative (i.e., dJ(t)/dt) will not decrease as t increases, where t represents position along any straight-line ray. This fact holds at every value of t where the derivative dJ(t)/dt exists. For piecewise-linear functions, such as the cost function J, the derivative does not exist at the breakpoints.

The method for selecting the best row and column pivot variables depends on first choosing the best pivot row for a given column. This process is repeated for each column, and the best overall choice is retained. Since the column variables in $v_c$ are zero, the process of swapping a column with a row involves setting that column's variable to some nonzero value, while keeping all other column variables at zero. The unknown new value for the column variable is designated by the letter t. The best pivot row is indicated by the value of t that minimizes the cost function J(t).

As stated above, the row vector is given by $v_r = f + G\ v_c$. Since all but one element of $v_c$ will be kept at zero, the candidate pivot column of G may be designated by the lowercase vector g. Thus $v_r = f + gt$, where t is an unknown real number.

The cost function J(t) depends directly only upon the e variables, so any elements of the row vector $v_r$ that are e variables will vary with $v_r = f + gt$ and change the value of the cost function J. If the pivot column is itself an e variable, then t will also contribute a term to the cost function J directly. All other elements of $v_c$ remain zero, and do not affect the value of J.

The e variables contribute to the cost function J only through summing the weighted cost terms $W_{pi}$ max(0, $e_i$) and $W_{ni}$ max(0, $-e_i$). These terms are all piecewise-linear and each has a single breakpoint at $e_i = 0$. Therefore J(t) is a piecewise-linear function of t, and its slope dJ/dt can change only at those values of t where some $e_i = 0$. The function J(t) can be completely described by tabulating its values at these $e_i = 0$ breakpoint values of t.

Since the row vector is $v_r = f + gt$, its with element $v_{ri}$ will go to zero when $t = -f_i/g_i$ as long as $g_i$ is nonzero. If $g_i = 0$ for any row, then t will not affect that row variable and it cannot contribute a breakpoint to J(t), so that row is removed from consideration.

Recall that any $x_i$ variable (or its $y_i$ counterpart) is required to lie in the interval $0 \leq x_i \leq x_{ui}$. This has the effect of restricting the range of permissible values for t. If the column variable is itself an x or y variable, then $0 \leq t \leq x_{ui}$. Furthermore, any x or y row variables also impose bounds on t. If the with row variable $v_{ri}$ is an x or y variable with upper bound $x_{uk}$, then t must satisfy $0 \leq v_{ri} = f_i + g_i t \leq x_{uk}$. This produces the following direct bounds on t:

$f_i/g_i \leq t \leq (x_{uk} - f_i)/g_i$ if $g_i > 0$ $(x_{uk} - f_i)/g_i \leq t \leq -f_i/g_i$ if $g_i < 0$ To determine the overall upper and lower bound on t, the above bounds for each x or y row variable are evaluated. If the column variable is itself an x or y variable, them the bounds $0 \leq t \leq x_{ui}$ are imposed. The overall upper bound on t is the smallest of all these separate upper bounds, and the overall lower bound on t is the largest of the separate lower bounds.

The goal is to find the value of t that minimizes J(t). For a smooth convex function such as a parabola, this would occur when dJ/dt=0. However, the gradient of the piecewise-linear J(t) changes in discrete steps at each $e_{i=}0$ breakpoint value of t. The minimum of J(t) must occur at a breakpoint where dj/dt increases from negative to positive. The Algorithm uses this fact to find the minimizing t using the following steps:

First determine the overall upper and lower bounds on t generated by the x and y upper and lower bounds, as described above.

Calculate the e zero breakpoint values $t = -f_i/g_i$ for each row of $v_r$ where $g_i$ is nonzero and the row represents an e variable.

Discard any t breakpoints that lie outside the upper and lower bounds for t .

Sort the remaining values of t into ascending order, using any efficient sorting algorithm such as the Shell algorithm.

Determine the right-sided slope djldt of J(t) at the lower bound of t.

If dj/dt>0 is true at the lower bound of t, then this value of t minimizes J(t).

Otherwise step through the t breakpoints in ascending order, accumulating the stepwise changes in dJ/dt at each breakpoint. The value of dJ/dt increases by $|W_{pi}\ g_k| + |W_{ni}\ g_k|$ at each breakpoint, where $W_{pi}$ and $W_{ni}$ are the penalty weights for the $e_i$ variable corresponding to that breakpoint, and where $g_k$ is the corresponding element of the column vector g.

If dJ/dt increases to a positive value at any breakpoint, then that value of t minimizes J(t).

If dj/dt is still negative at the upper bound of t, then that value of t minimizes J(t).

It is possible to have degenerate matrix data in which multiple $e_i$ variables hold the same values. In these cases, there would be repeated $e_{i=}0$ breakpoints at the same value of t. If the minimum of J(t) occurs at such a repeated breakpoint, then any of the $e_i$ row variables associated with the breakpoint could serve equally well as a pivot row to minimize J(t). In these degenerate cases, the Algorithm includes all such degenerate $e_i$ row variables in its search for the overall best pivot row and column.

Choosing the overall best pivot row and column pair simply involves repeating for each column the minimization of J(t) described above. For each column, the pivot row (or rows, in degenerate cases) that minimizes J(t) and the current column are compared against the best candidate pivot row and column found so far. When a new candidate pair has a higher evaluation score than the previous best, it is retained. After all columns have been examined, the surviving best row-column pair is used to perform the pivoting step described above.

The Dailey L1 Optimization Algorithm combines two criteria to determine the best choice: (1) the amount by which the cost function J decreases, and (2) the magnitude of the pivot element. In order to minimize roundoff error, it is desirable to use pivot elements with magnitudes relatively close to 1. Each candidate row-column pair is assigned an evaluation score using this function:

$$\frac{\Delta J}{\max\left(|g_{if}|, \left|\frac{1}{g_{if}}\right|\right)}$$

where Δj is the magnitude of the reduction in cost function J, and where $g_{ij}$ is the candidate pivot element. In this way, the further the pivot element magnitude strays from 1 in either direction, the more the resulting cost reduction is devalued.

Flow Diagram of the Algorithm

The Dailey L1 Optimization Algorithm cost function J is defined by:

$$J = \sum_{i=1}^{m} W_{pi}\max(0, e_i) + \sum_{i=1}^{m} W_{ni}\max(0, e_i)$$

$$e = Ax + b$$

$$x_{li} \leq x_i \leq x_{ui}$$

The Algorithm first performs a change of variables to make all the lower bounds on $x_i$ equal to zero. The upper bounds are then given by $x_{ui}-x_{li}$. The change of variables is reversed after the Algorithm converges. Therefore, in most of this discussion it is assumed that $x_1=0$.

The L1 Algorithm stores most of its problem data in the tableau matrix C, which is first initialized using the A matrix and b vector from the cost function definition.

$$C = [b \ A] = [f \ G]$$

As the Algorithm proceeds to modify C through successive pivoting operations, the first column is always designated by f and the remaining columns by the matrix G. The matrix C always represents a mapping from the vector of column variables $v_c$ into the vector of row variables $v_r$, given by $v_r = f + G \ v_c$. Initially, the row vector is $v_r = e$, and the column vector is $v_c = x$. Each pivoting step swaps a pair of variables between $v_r$ and $v_c$. As they are swapped, their corresponding index numbers are swapped between a pair of index arrays holding this integer data for $v_r$ and $v_c$. The index array for $v_r$ is named $k_r$, and the index array for $v_c$ is named $k_c$.

In order to represent variables on their upper bounds, the Algorithm also defines a set of alternate variables $y_i = x_{ui} - x_i$, in which each $x_i$ variable is subtracted from its upper bound. At appropriate times, $x_i$ variables are replaced by their $y_i$ counterparts, and vice versa. Each $e_i$, $x_i$, and $y_i$ variable receives a unique index number for bookkeeping purposes. The choice of index numbers is arbitrary. The assignments used herein are: 1 through m for the $e_i$ elements, (m+1) through (m+n) for the $x_i$ elements, and (m+n+1) through (m+2n) for the $y_i$ elements. This rule allows the Algorithm to determine whether a given element of $v_r$ or $v_c$ is currently an $e_i$, $x_i$, or $y_i$ variable, by checking the index in the corresponding elements of $k_r$ and $k_c$.

Figure 22:
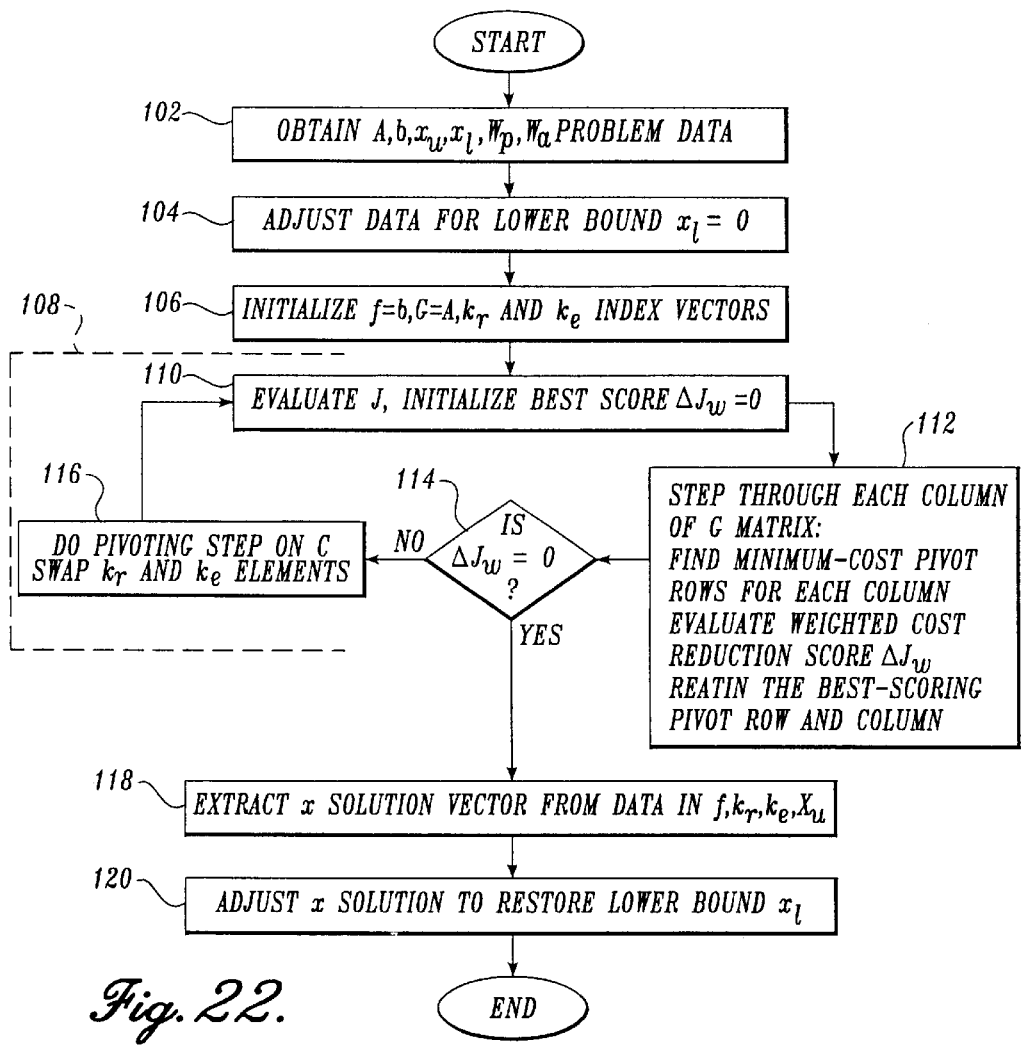
FIG. 22 is a flow chart of an L1 Optimizer formed in accordance with the present invention.

The flowchart in FIG. 22 illustrates the top-level operation of the Algorithm, and its major iteration loop. In essence, it repeatedly reduces the cost function J by choosing the best possible weighted cost reduction $\Delta J_w$ at each iteration. When J can no longer be reduced by any pivoting operation, then J has reached its global minimum. Reaching the global minimum is guaranteed because J is a convex function.

Referring to FIG. 22, the Algorithm may be summarized as follows:

At block 102, obtain the input data A, b, $x_u$, $x_1$, $W_p$, $W_n$. At block 104, adjust the input data to set $x_1=0$. Replace b with b+A $x_1$, replace $x_u$ with $x_u-x_1$, and replace $x_1$ with 0. Save the initial values of $x_i$ to reverse this process later. At block 106, initialize C=[f G] using f=b, G=A. Initialize row index vector $k_r$ with indices 1 through m, and initialize column index vector $k_c$ with indices (m+1) through (m+n). The matrix C always represents the mapping $v_r=f+G \ v_c$, where initially the row and column vectors are $v_r=e$ and $v_c=x$. At block 108, is the iteration loop where the cost function J is evaluated. Initialize the weighted cost reduction score Δ $J_w$ to zero at block 110.

At block 112, step through each column g of the matrix G, and do the following for each: Identify the row or rows of that column which minimize the cost function J when used as a pivot with the current column. The process is described above, and involves algebra on the elements of f and g, the weighting vectors Wp and Wn, references to the index vectors $k_r$ and $k_c$, and a sorting operation. For each of these minimizing rows, evaluate the weighted cost reduction $\Delta j_w$, using the formula in the text to weight the actual cost reduction $\Delta J_w$ to favor pivot magnitudes near 1.0. If $\Delta J_w$ exceeds the previous best value, retain the new $A\Delta J_w$ value and the current row and column choice as the pivot candidates.

If at inquiry 114 the optimal choice of row and column pivots reduces the cost function J, then perform the pivoting step on the optimal row and column pivots at block 116. This transforms all the elements of C as described above. Also swap the elements of $k_r$ and $k_c$ for the row and column pivots. If an $x_i$ or $y_i$ variable goes to its upper bound$x_{ui}$ as a result of the pivot operation, transform its index value in $k_r$ or $k_c$ to convert it from an $x_i$ variable to its $y_i$ counterpart, or vice versa. If the optimal choice of row and column pivots did not reduce the cost function J, exit the iteration loop 108 since convergence is achieved.

At block 118, extract the optimal solution x from the C matrix by stepping through the elements of $k_r$ and $k_c$. This is done by first initializing all $x_i=0$. The next step is to go through the row index elements $k_{ri}$, for i from 1 to m. If $k_{ri}$ represents an x variable $x_j$, set that x variable to $f_i$, the element in row i, column 1 of C. If $k_{ri}$ represents a y variable $y_j$, set the corresponding $x_j$ variable to $x_{uj}-f_i$ where $x_{uj}$ is the upper bound $x_j$. Continue on by stepping through the column index elements $k_{ci}$, for i from 1 to n. If $k_{ci}$ represents a y variable $y_j$, set the corresponding $x_j$ variable to $x_{uj}$ the upper bound for that variable. Any $x_i$ variables not set by this process have values of zero.

At block 120, adjust the optimal solution x to account for the original lower bounds. Replace x with x+$x_1$, where $x_1$ holds the original lower bounds. Finally return the optimal solution x to the calling routine.

The number of iterations required for the L1 Algorithm to converge to the optimal solution x is data-dependent. Generally, the number of iterations is proportional to mn², so doubling both the number of unknowns in x and constraints in e will increase execution time by roughly a factor of 8.

For a particular application, testing over a range of input conditions can reveal the performance the Algorithm will exhibit in terms of the number of iterations and the amount of computer CPU time consumed. However, many real-time systems require a guaranteed maximum execution time from all algorithms. In a real-time control system, the L1 optimization calculation can be spread out over multiple time frames, using the most recently completed solution and an associated gain matrix to approximate the optimum during each frame. This feature is important in order to guarantee a minimum execution time (latency) in an embedded control system.

By placing a limit on the number of pivoting iterations per call, and then by resuming the suspended iteration process on subsequent calls, a subroutine for L1 optimization can provide a guaranteed maximum execution time per call, which is proportional to the allowed number of iterations. This resolves the execution time problem for "hard" real-time systems.

However, when the optimal solution x finally emerges from this multi-frame iteration process, it solves the problem data from the earlier frame when the iteration process began. It does not solve the problem data for the current frame. The problem data are given by A, b, $w_p$, $W_a$, $x_u$, and $x_1$; typically, the contents of b will change for each frame, while the other problem data will change slowly or not at all. Real-time embedded controllers have requirements on data latency as well as on execution time: a signal may not take more than a given number of frames (usually one) to propagate through the controller. Multiple-frame time delays can cause stability problems in some feedback systems, and can degrade system performance in other ways.

This problem can also be resolved by extracting a gain matrix from the L1 Optimizer in addition to the optimal solution x. The gain matrix can be used in a foreground task in the embedded controller software to provide a fast, low-latency-ime signal path, while the full optimal solution can be executed in the background at slower sample period, if necessary to meet throughput requirements. This feature of the L1 Solver allows system designers to make a tradeoff between speed and accuracy.

The tableau matrix C=[f G] is partitioned to distinguish its first column f from the remaining columns G. After convergence, it is f that contains the unconstrained x variable values, since holds the row variables in $v_r$. However, the G matrix also contains a great deal of useful information about the optimal solution. The contents of G can be interpreted as a gain matrix that maps perturbations in b into perturbations in the optimal x. This gain matrix provides approximate solutions that are actually identical to the optimal solution in a sufficiently small neighborhood of the optimum. The reason is that the optimal x is a piecewise-linear function of b; therefore, a linear gain matrix can describe it exactly within one of its linear regions.

Define a new matrix H having m+n rows and m+n columns. It has the 2-by-2 block structure shown below, in which $H_{ee}$ and $H_{ex}$ have m rows, $H_{xe}$ and $H_{xx}$ have n rows, $H_{ee}$ and $H_{xe}$ have m columns, and $H_{ex}$ and $H_{xx}$ have n columns. The H matrix maps perturbations in certain elements of e and x into perturbations in the remaining elements of e and $x_t$ in the neighborhood of the optimal x. Specifically, its inputs are perturbations in those elements of e and x that are column variables in $v_r$. It outputs are perturbations in those elements of e and x that are row variables in $v_r$. Recall that $v_r$=f+G $v_c$ after any pivoting step.

$$\begin{bmatrix} \Delta e \\ \Delta x \end{bmatrix}_{v_r} = \begin{bmatrix} H_{ee} & H_{ex} \\ H_{xe} & H_{xx} \end{bmatrix} \begin{bmatrix} \Delta e \\ \Delta x \end{bmatrix}_{v_c} = H \begin{bmatrix} \Delta e \\ \Delta x \end{bmatrix}_{v_c}$$

The elements of H are simply copied directly from the elements of G after convergence. It represents an "unscrambling" of the rows and columns of G, to restore the original order of the e and x variables. Because any element of $v_r$ or $v_c$ can represent either an e or an x variable, the H matrix is defined with enough rows and columns to represent any possible final configuration of e and x variables at the optimal solution. Any y variables in $v_r$ or $v_c$ are converted into x variables by reversing the sign of their matrix rows or columns before copying from G into H: recall that $y_i=x_{ui}-x_i$.

For any e or x variable that does not appear in $v_c$, the corresponding columns of H are zero. Similarly, for any e or x variable that does not appear in $v_r$, the corresponding rows of H are zero. Since the G matrix has m rows and n columns, H will always have n rows and m columns filled entirely with zeros.

The H matrix represents the sensitivity of the unconstrained e and x variables with respect to the constrained e and x variables, in the neighborhood of the optimal solution. For an e variable, "unconstrained" means nonzero. For an $x_i$ variable, it means the variable is not on its upper or lower bounds $x_{ui}$ or $x_{li}$.

For example, consider an typical optimal solution in which all of the column variables in $v_c$ are e variables, and are thus constrained to zero. In this case, $H_{ex}$ and $h_{xx}$ will be zero, since there are no x variables in $v_c$. $H_{xe}$ would provide the gain matrix data for use by an embedded control law, since it provides the sensitivity from the constraints e to the solution variables x.

However, it is more useful to consider the effect of varying the problem data vector b, rather than varying e directly. The actual cost function is defined in terms of e=Ax+b. In an embedded control system, the control commands and sensor data will typically enter the problem as elements in the b vector.

The $H_{xe}$ submatrix gives the sensitivity of x variables to changes in those e variables that are zero at the optimum. If an element of b is perturbed in a small neighborhood of the optimum, these e variables will continue to be zero at the new, perturbed optimum solution, because they are the active constraints. Thus it is necessary to know how the optimal x must vary when an element of b is perturbed, assuming that the e variable for that element of b is an active constraint being held at zero.

Suppose that b is perturbed to a new value b+Δb, where Δb has only one nonzero element, affecting an active constraint element of e. In order for that element of e to remain zero, x must change to cancel the perturbation in e caused by perturbing b. This occurs when x is perturbed by an amount $\Delta x = H_{xe} \Delta b$. Thus the desired gain matrix K, mapping b perturbations into x perturbations, is simply given by $K=-H_{xe}$.

Figure 23:
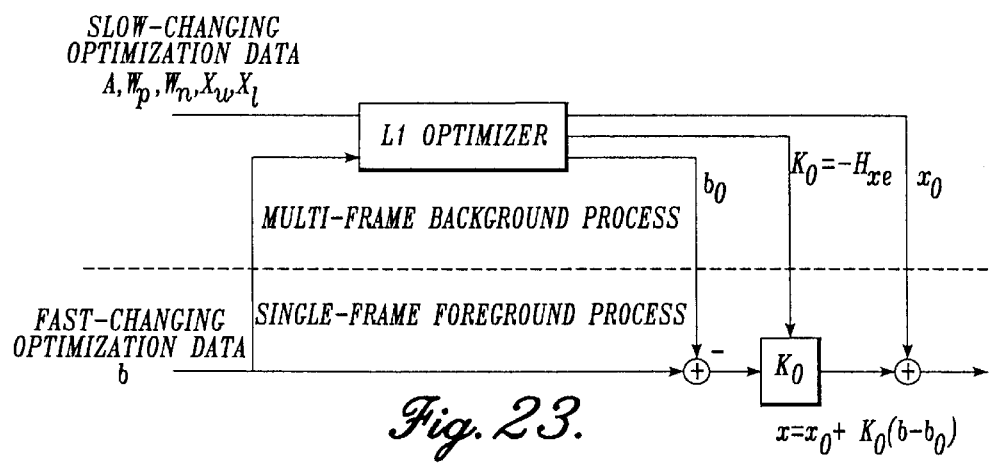
FIG. 23 is a signal flow diagram for the multi-rate real-time L1 Optimizer described by FIG. 22.

FIG. 23 shows the signal flow structure of an L1 Optimizer arrangement suitable for multi-rate embedded real-time applications. The L1 Algorithm is called once per time frame, but with a fixed limit on the number of pivoting iterations per call, so that it may take multiple frames to converge to a solution. At all times, the most recently completed solution vector is called $x_0$. The value of the problem data vector b that was used to generate $x_0$ is called $b_0$, and the gain matrix $K=-H_{xe}$ corresponding to $x_0$ is called $K_0$. These quantities describe the optimal solution to the problem data that was presented to the L1 Algorithm a few frames in the past. They are used to generate a fast, low-latency output signal, which always corresponds to the current frame's input vector b.

The implementation is as follows. At each time frame, calculate $\Delta b = b - b_0$, the difference between the new input b and the most recent b for which a solution is available. Multiply by the gain matrix $K_0$ to generate an increment to x: $\Delta x = K_0 \Delta b$. Then add Δx to the most recent optimal solution: $x = x_0 + \Delta x = x_0 + K_0 b$. This estimated optimal x is then returned by the embedded L1 Solver as the low-latency output for the current frame. The L1 Algorithm itself can then be called as a background process, to complete another set of iterations on its current set of problem data. Each time the L1 Algorithm converges, it copies its new values for $b_0$, $x_0$, and $K_0$ into storage for use in the next time frame; then it reads the current values of the problem data A, b, $W_p$, $W_n$, $x_u$, and $x_1$ and begins a new iteration cycle.

This linear estimate $x = x_0 + K_0 \Delta b$ is an accurate prediction of the true optimal solution for the new value of b, assuming that A and the other problem data have not also changed.

As noted above, it is identical to the true optimal solution if b has remained within the current piecewise-linear region of the optimal solution. For example, in a control output mixer, if the new b does not cause the true optimal x to cross a new saturation limit, then the estimated x is equal to the true optimum. Estimation errors will appear only as brief transients after large changes to the input.

Still referring to FIG. 23, operations below the dashed line occur once per frame, using the most recently available data, to provide a low-latency signal path with guaranteed execution time. The L1 Optimization Algorithm, shown above the dashed line, runs as a multi-frame background process with a fixed iteration limit during each frame to provide guaranteed per-frame execution time.

Because the gain matrix $K_0$ has n rows and m columns, the number of floating point operations required in each frame to calculate $x = x_0 + K_0 \Delta b$ is only mn. This is a quite small amount of computing overhead, easily handled by modern embedded control processors.

While the preferred embodiment of the invention has been illustrated and described, it will be appreciated that various changes can be made therein without departing from the spirit and scope of the invention. For example, discrete time integration could be provided based on a method other than the Euler discrete time integration method used above.

The embodiments of the invention in which an exclusive property or privilege is claimed are defined as follows:

1. A method of distributing a pseudo-control vector ($u_c$) amongst multiple plant effectors, the method comprising:
   (a) differencing a command target signal ($u_c$) with an actual target vector ($u_a$) at a first combiner (86) to form a target error signal ($u_e$);
   (b) applying an L1 Optimizer to the target error signal to solve for an optimal control effector output signal (u), the L1 Optimizer applying absolute penalty weights ($W_{pi}$, $W_{ni}$) to the target error signal and solving a cost function (J) for the optimal control effector output signal (u);
   (c) providing the optimal control effector output signal (u) to the plant;
   (d) feeding back the optimal control effector signal through a target gain matrix (F) to form a gain-applied effector signal; and
   (e) combining the gain-applied effector signal with a bias vector signal ($u_b$) to form the actual target vector ($u_a$);
wherein the application of the control signal in the plant results in an optimal mapping of the command target signal ($u_c$) onto the control effector output signal (u) in a manner consistent with the L1 optimization weights.

2. The method according to claim 1, wherein there are a number of control effector output signals (u) a greater or equal to a number of command target signals ($u_c$).

3. The method according to claim 1, wherein the cost function (J) is of the form $$J = \sum_{i=1}^{m} W_{pi} \max(0, u_{ei}) + \sum_{i=1}^{m} W_{ni} \max(0, -u_{ei})$$

where m is the number of elements (i) in the target error signal ($u_e$), $W_{pi}$ is the penalty weight on positive target error signals ($u_{ei}$), and $W_{ni}$ is the penalty weight on negative target error signals ($u_{ei}$).

4. The method according to claim 3, wherein the absolute penalty weights ($W_{pi}$, $W_{ni}$) of at least one element (i) are equal in magnitude in order to establish equality constraints.

5. The method according to claim 3, wherein at least one of the absolute penalty weights ($W_{pi}$, $W_{ni}$) of at least one element (i) is set equal to zero in order to establish inequality constraints.

6. The method according to claim 3, wherein the weights ($W_{pi}$, $W_{ni}$) of a first element differ in magnitude from the weights of a second element in order to prioritize the commands and control effectors.

7. The method according to claim 1, wherein during failure of a control effector to a specific value, upper and lower allowable bounds for that effector are set to the same value.

8. A method of forming an optimal feedback control signal (u) for use with a plant, the method comprising:
   (a) combining a command signal ($y_c$) with a regulator sensor signal ($y_r$) and an optimal injection error signal ($y_e$) to form an error signal (e); the injection error signal ($y_e$) being calculated by an L1 Optimizer (72); the L1 Optimizer applying absolute penalty weights ($W_{pi}$, $W_{ni}$, $W_{ei}$) to the feedback control signal (u) and the injection error signal ($y_e$) and solving a cost function (J) for the optimal injection error signal ($y_e$);
   (b) applying a discrete differencer (62) to the error signal (e) to form an error difference signal ($e_d$); applying a proportional error gain ($K_{pe}$) to the error difference signal ($e_d$) and providing the result to a second combiner (42);
   (c) applying a discrete integrator gain ($K_i h$) to the error signal (e) and providing the result to the second combiner (42);
   (d) forming a control difference signal ($u_d$) as the output of the second combiner (42); and
   (e) applying a discrete integrator (66) to the control difference signal ($u_d$) to form the feedback control signal (u), the feedback control signal (u) being provided to the plant;
wherein the method is digitally implemented using a discrete-time step size, the signals being either discrete scalar, vector, or matrix signals; the gains being matrix gains, and each differencer being of the form $(1-z^{-1})$ and the integrator being of the form $1/(1-z^{-1})$.

9. The method according to claim 8, wherein an invertible mixer matrix (70) is applied to the control difference signal ($u_d$) after the discrete integrator (66) and before providing the control signal (u) is provided to the plant.

10. The method according to claim 8, wherein the second combiner (42) receives as a further input a feedforward signal formed by applying a differencer (60) and a feedforward gain ($K_f$) to the command vector ($y_c$).

11. The method according to claim 8, wherein the second combiner (42) receives as a further input a proportional sensor signal formed by applying a differencer (64) and a proportional sensor gain ($K_{ps}$) to a proportional sensor signal ($y_p$), the proportional sensor signal ($y_p$) being a function of the plant's actual condition.

12. The method according to Claim 8, wherein the proportional sensor signal ($y_p$) is filtered to apply desired dynamic responses of the control system to the plant measurements.

13. The method according to claim 8, wherein the regulator sensor signal ($y_r$) is filtered to apply desired dynamic responses of the control system to the plant measurements.

14. The method according to claim 8, wherein the integrator (66) applied to the control difference signal ($u_d$) includes a maximum limit and a minimum limit.

15. The method according to claim 8, wherein the cost function (J) is of the form $$J = \sum_{i=1}^{r} W_{ei}|y_{ei}| + \sum_{i=1}^{m} W_{pi}\max(0, u_i - u_{ui}) + \sum_{i=1}^{m} W_{ni}\max(0, u_{li} - u_i)$$

where m is the number of elements (i) in the feedback control signal (u), $W_{pi}$ is the penalty weight on positive control signals ($u_i$), $W_{ni}$ is the penalty weight on negative control signals ($u_i$), and $W_{ei}$ is the penalty weight on the absolute value of injection error signals ($y_{ei}$).

16. The method according to claim 8, wherein the L1 Optimizer is applied to the control difference signal ($u_d$) after the discrete integrator (66) and before providing the control signal (u) to the plant; the L1 Optimizer providing an optimal distribution of output mixing between control effectors by applying absolute penalty weights ($W_{pi}$, $W_{ni}$, $W_{ei}$) to the target error signal ($u_e$) and the injection error signal ($y_e$), and solving a cost function (J) for the optimal control effector output signal (u) and injection error signal ($y_e$).

17. The method according to claim 16, wherein the number of control effector output signals (u) is greater or equal to the number of command target signals ($u_c$).

18. The method according to claim 16, wherein the cost function (J) is of the form $$J = \sum_{i=1}^{r} W_{ei}|y_{ei}| + \sum_{i=1}^{m} W_{pi}\max(0, u_{ei}) + \sum_{i=1}^{m} W_{ni}\max(0, u_{ei})$$

where m is the number of elements (i) in the target error signal ($u_e$), $W_{pi}$ is the penalty weight on positive target error signals ($u_{ei}$), and $W_n$ is the penalty weight on negative target error signals ($u_{ei}$), and $W_{ei}$ is the penalty weight on the absolute value of injection error signals ($y_{ei}$).

19. The method according to claim 18, wherein the absolute penalty weights ($W_{pi}$, $W_{ni}$) of at least one element (i) are equal in magnitude in order to establish equality constraints.

20. The method according to claim 18, wherein at least one of the absolute penalty weights ($W_{pi}$, $W_{ni}$) of at least on element (i) is set equal to zero in order to establish inequality constraints.

21. The method according to claim 18, wherein the weights ($W_{pi}$, $W_{ni}$, $W_{ei}$) of a first element differ in magnitude from the weights of a second element in order to prioritize the commands and control effectors.

22. The method according to claim 16, wherein during failure of a control effector to a specific value, upper and lower allowable bounds for that effector are set to the same value.

* * * * *